June 6, 1961 A. H. FAULKNER 2,987,250

ELECTRONIC TOTALIZER

Filed April 23, 1954 8 Sheets-Sheet 1

INVENTOR.
ALFRED H. FAULKNER

BY Wm. Walter Owen

ATTY.

INVENTOR.
ALFRED H. FAULKNER
BY [signature]
ATTY.

June 6, 1961 A. H. FAULKNER 2,987,250

ELECTRONIC TOTALIZER

Filed April 23, 1954 8 Sheets-Sheet 3

INVENTOR.
ALFRED H. FAULKNER
BY Wm. Watts Owen.
ATTY.

June 6, 1961 A. H. FAULKNER 2,987,250

ELECTRONIC TOTALIZER

Filed April 23, 1954 8 Sheets-Sheet 4

INVENTOR.
ALFRED H. FAULKNER

BY [signature]

ATTY.

INVENTOR.
ALFRED H. FAULKNER
BY Wm. Walter Owen
ATTY.

INVENTOR.
ALFRED H. FAULKNER
BY Wm. Watts Owen
ATTY.

June 6, 1961 A. H. FAULKNER 2,987,250

ELECTRONIC TOTALIZER

Filed April 23, 1954 8 Sheets-Sheet 7

INVENTOR.
ALFRED H. FAULKNER

BY

ATTY.

FIG. 7

LAMPS LIST

| OPERATED RELAYS | | DIGIT | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|---|
| 605 | 669 | 0 | | X | X | | X | | | X | X | | | X | X | | | X | X | | | X | | X | X | |
| 616 | 669 | 1 | | | X | | | | X | | | | X | | | | X | | | | X | | | | X | |
| 627 | 669 | 2 | | X | X | | X | | | X | | | X | | | X | | | X | | | | X | X | X | X |
| 638 | 669 | 3 | X | X | X | X | | | | X | | | X | | | | | X | X | | | X | | X | X | |
| 649 | 669 | 4 | | | X | | | X | X | | X | | X | | X | X | X | X | | | X | | | | X | |
| 605 | 659 | 5 | X | X | X | X | X | | | | X | X | X | | | | | X | X | | | X | | X | X | |
| 616 | 659 | 6 | | X | X | | X | | | | X | X | X | | X | | | X | X | | | X | | X | X | |
| 627 | 659 | 7 | X | X | X | X | | | | X | | | X | | | X | | | X | | | | X | | | |
| 638 | 659 | 8 | | X | X | | X | | | X | | X | X | | X | | | X | X | | | X | | X | X | |
| 649 | 659 | 9 | | X | X | | X | | | X | | X | X | X | | | | X | | | | X | | X | X | |

INVENTOR.
ALFRED H. FAULKNER
BY [signature]
ATTY.

United States Patent Office 2,987,250
Patented June 6, 1961

2,987,250

ELECTRONIC TOTALIZER

Alfred H. Faulkner, Chicago, Ill., assignor to Automatic Electric Laboratories, Inc., a corporation of Delaware
Filed Apr. 23, 1954, Ser. No. 425,070
16 Claims. (Cl. 235—92)

This invention relates in general to a totalizing system and more particularly to an electronic totalizing system wherein items varying or the same in amount or type may be very rapidly registered, from any different positions, totalled, acknowledged and indicated.

Totalizing systems find their most general application in totalizing bets and therefore have been purchased in great quantity by race track managements as the volume and size of bets and interest in racing has developed in recent years. The growth in size and volume of bets has resulted in a parallel growth of the complexity and expense of totalizing systems. Most tracks have a number of booths called windows at which a bet of one particular denomination or value may be placed. For example, a track may have 100 windows at which a $2.00 bet may be placed on any entry in a particular race to win, 50 windows at which a $5.00 bet may be placed on any entry in a particular race to win, 25 windows at which a $10.00 bet may be placed, 15 windows at which a $50.00 bet may be placed and 10 windows at which a $100.00 bet may be placed. There are also generally corresponding windows at which corresponding bets may be placed on any particular entry to place or show. The operator at a window by pressing a key of the keyset associated with the ticket issuing machine marks a lead corresponding to the entry so that the bet may be registered. Thus the totalizing system must be arranged so that many different operators may each register a bet on a particular entry in a corresponding adding machine known as a runner adding machine and in a total adding machine, so that the total amount bet to win, place or show may be indicated and an acknowledgement that each bet is registered must be made so that the ticket issuing machine at the window from which the bet is registered may issue a ticket corresponding to the amount bet, the entry and the class such as win, place or show. As many bets are being placed simultaneously or nearly so, a method is provided for sequential registration of bets either by means of stepping switches or relays (both commonly called collectors or distributors) so that each bet is individually registered by enabling the marking on the marked lead to be forwarded to the adding machines for changing the count registered in the adding machines. The operate time of relays or electromagnetic stepping means is measured in milliseconds and usually cannot be less than 5 milliseconds. Therefore to scan each of the 200 positions in the win class with the apparatus now in use requires about ten seconds, which means an average delay of about five seconds. Ticket issuing machines are generally capable of issuing tickets at the rate of one a second and therefore a delay of five seconds before a ticket may issue is excessive. To eliminate this problem duplicate apparatus is provided for scanning different groups of positions to enable bets to be registered quickly and simultaneously so that the ticket issuing machines may be operated without undue delay. This results in expensive duplication and systems of great complexity. In the present system however each position or window associated with a particular ticket issuing machine, hereinafter abbreviated T.I.M., is scanned in a period of 500 microseconds, so that 200 positions may be scanned in a tenth of a second or an average delay of one twentieth of a second.

Instead of marking leads directly, a tube individually associated with each T.I.M. is prepared by the operator, whenever a contact is closed on the key set of the machine. A lead individual to the entry or runner adding machine is also connected to the cathode of the tube if its corresponding contact on the keyset of the T.I.M. is closed. A parallel lead is always connected from the tube to the denominational input circuit of the total adding machine corresponding to the particular denomination of the T.I.M. Another tube individual to T.I.M. is also prepared whenever a contact is closed for enabling the T.I.M. to operate when it is fired. An electronic scanning device, hereinafter referred to as a collector or distributor, comprising several counting circuits or chains advanced by an oscillator is used for sequentially activating means for firing each first T.I.M. tube sequentially, if it has been previously prepared and further preparing the other tube. The counting circuits each comprise a number of tubes, each of said tubes individually associated with only a predetermined number of pairs of T.I.M. tubes. Thus, each tube of one counting circuit is individually associated with one group of a predetermined number of associated pairs of T.I.M. tubes. The tubes of the other counting circuit, are each individually associated with one associated pair of T.I.M. tubes of each group of T.I.M. tubes so that only one associated pair of T.I.M. tubes in each group is common to both one tube in the first counting circuit and one tube in the other circuit and can only be fired if both latter tubes are properly conditioned as a result of said oscillator having advanced said counting circuits to activate said means. The oscillator advances the electronic scanning device once every 500 microseconds to achieve extremely rapid scanning as before stated. The first T.I.M. tube on firing produces an electrical pulse across its cathode resistor which is formed by certain circuit arrangements for marking the aforementioned leads and advancing the runner and total adding machines, which after they are advanced return an electrical pulse for firing within said period of 500 microseconds the other tube previously prepared on closure of a contact by the operator and by said means to enable its associated T.I.M. to issue a ticket.

The present invention is adapted for use in a betting arrangement of the type described wherein an operator at one window may register one particular value of bet on any entry for a particular class of finish result. The electronic collector is provided to scan each T.I.M. tube for the purpose of registering bets placed. The keyset of each T.I.M. is arranged to connect the T.I.M. tube individual to the particular machine to the correspondingly valued input circuit of a runner adding machine hereinafter abbreviated R.A.M., individual to the entry and the class of result. The tube as previously stated is also connected to the correspondingly valued input circuit of a total adding machine, hereinafter abbreviated T.A.M., at which all the bets in a particular class of result namely either the win pool, place pool or show pool are totalled. Therefore, when the operator presses a key corresponding to the entry, on his particular keyset, he prepares the T.I.M. tube and connects the R.A.M. individual to the entry to the cathode of the tube so that when the collector scans his position a registration is made corresponding to the value of the bet in the R.A.M. and the T.A.M. and a pulse is returned from each, which if synchronized, permits an acknowldgement pulse to be returned to the position for enabling the T.I.M. to issue a ticket. This pulse can only be returned if both machines register so that issuance of a ticket is prevented unless both registrations are properly made.

The R.A.M.'s and the T.A.M.'s, each comprise a plurality of electronic counting circuits or storing circuits, each counting circuit corresponding to different denominations. Lamp indicators are associated with each counting circuit in all the machines to permit a reading to be made of the count in each circuit at any particular time. Thus each adding machine has a units counting circuit, tens counting circuit, hundreds counting circuit and thousands counting circuit. Higher valued counting circuits may be provided but are not necessary for the illustration of this invention. Intermediate values are registered in each of the counting circuits in a manner to be explained although separate counting circuits may be provided. The electronic counting circuits and their associated circuits are extremely fast acting so that a registration may be made and an acknowledgement pulse returned to the particular position making the registration within the 500 microsecond period previously mentioned.

Cross talk on the cables between the adding machines and the individual positions is prevented by special rectifier arrangements which will be discussed.

Race tracks are provided with infield display boards for indicating total amounts bet in each pool and on each entry. These boards generally comprise a panel of lights for each digit in the respective win, place and show pools such as disclosed in Patent No. 2,121,164 issued June 21, 1938 to Harold C. Robinson. The count registered in the adding machines corresponding to each entry and to each pool is transferred periodically by a unique arrangement to form a configuration in each light panel of the pool corresponding to the numerical indication of the total amount bet in the pool. This indication is periodically changed as the adding machines are continuously registering new bets, and the configuration at the display board can only conform to a readable digit if the proper apparatus is operated. Thus to form an unreadable digit is tantamount to operating an alarm. The manner in which this registration is changed and the manner in which the indications are transferred from the electronic counting circuits to the display board is shown only for the total adding machine, it being understood that the other adding machines and display board units function in the same manner. The foregoing discussion has been primarily for the purpose of illustrating the arrangement in which the present invention will be discussed, however it is to be understood that a totalizing system of the type described herein may be readily adapted or modified to any situation wherein number or value is totaled.

FIG. 1 is a schematic of the oscillator circuit used for stepping the electronic collector, the acknowledgement circuit and part of the arrangement for periodically registering the total values in the T.A.M.'s on the infield display boards.

FIG. 1*a* is the electronic collector or distributor arrangement which comprises two series of tubes arranged as counting circuits and certain tubes and circuits associated with each series. Only a representative portion of the collector circuits are shown.

FIG. 2 shows the arrangement of the keyset connections of several $2.00 T.I.M.'s and the manner in which they are interconnected between the R.A.M., T.A.M. and the collector. Other machines of the same class having $5.00, $10.00, $50.00 and $100.00 valuations are connected in a similar manner to their respective input circuits of the R.A.M.'s and T.A.M.'s and are scanned by the same collector. Although the present invention is designed to work with any well-known type of T.I.M., the type of T.I.M. machine disclosed in an application by Johnston and Coulombe, Jr., filed January 15, 1953, Serial No. 331,448 now Patent No. 2,750,880 might be used with slight modification of the keyset to provide a contact operation to be discussed.

FIG. 7 is a chart showing which lights are lighted when relays corresponding to digits 0–9 are operated to form corresponding digits in the light panel.

BRIEF DESCRIPTION

Figure 2:
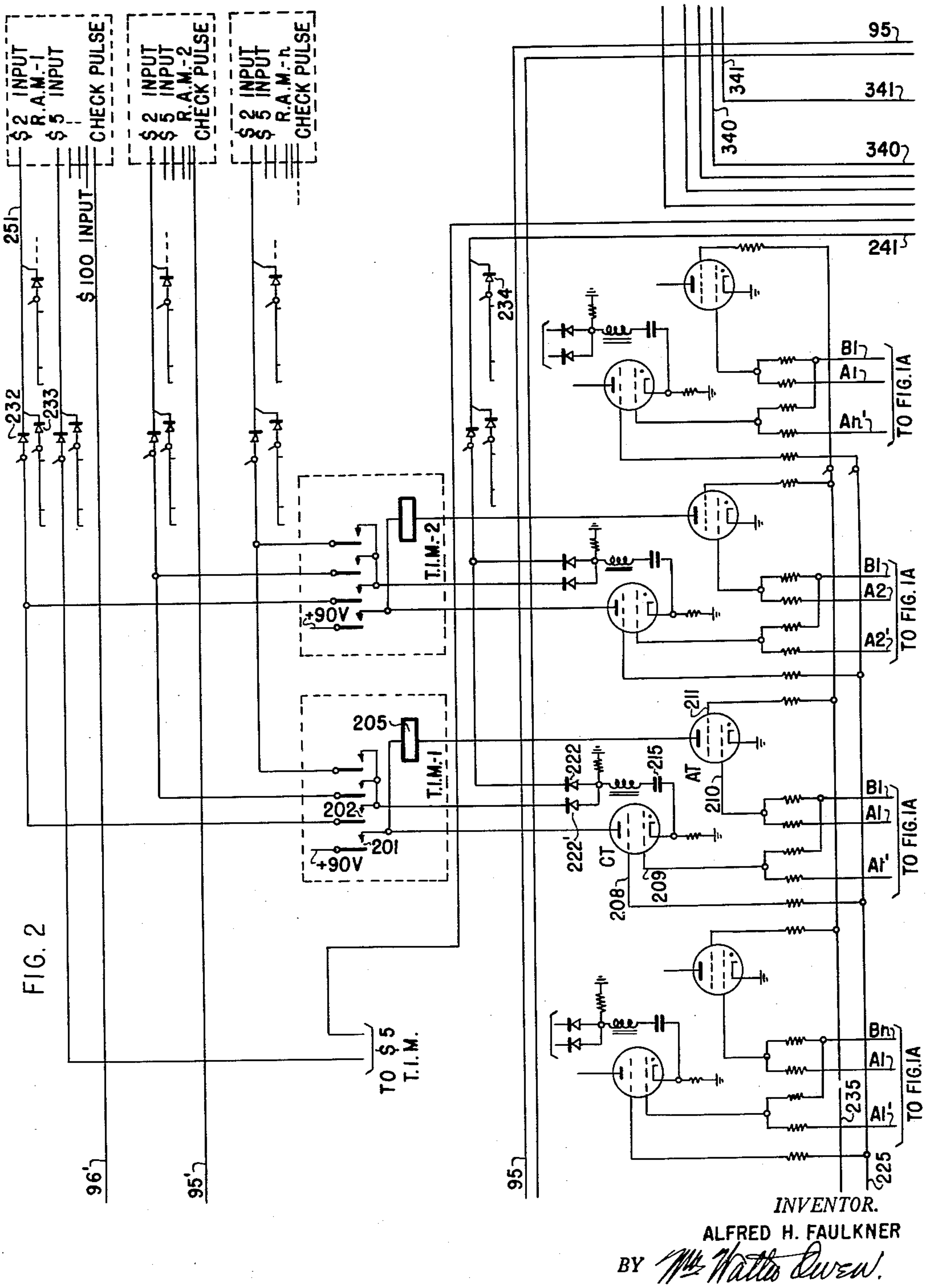

It will be noticed that each of the T.I.M.'s, namely T.I.M.–1 and T.I.M.–2 diagrammatically shown in FIG. 2 can be connected by closing a contact, individual to a particular entry, on the keyset, such as 202, only to the $2.00 input circuit of R.A.M.–1—R.A.M.–*n*, each individually corresponding to each of the entries in a particular race. Each T.I.M. is also limited to a particular pool namely, in this illustration, the win pool. T.I.M.–1 and T.I.M.–2 are each commonly connected to the $2.00 input circuit of the of the T.A.M. of a particular pool as are all other $2.00 T.I.M.'s corresponding to the particular pool. A plurality of other groups of T.I.M.'s are provided for each pool, each group differently valued and arranged so that all T.I.M's in each group are commonly connected to the $5.00 input, $10.00 input, $50.00 input and $100.00 input circuits respectively of the T.A.M. of their particular pool and are connected to a corresponding input circuit of each R.A.M. by operation of a key corresponding to the particular R.A.M. or entry of their corresponding pool. Rectifiers, individual to each T.I.M. and individual to subgroups of T.I.M.'s are arranged between each input circuit of an R.A.M. and T.A.M. respectively and corresponding T.I.M.'s for preventing feed back between the T.I.M. tube circuits and undue shunting of the adding machine input circuits.

Whenever one of the contacts such as 202 corresponding to a particular entry on a T.I.M. machine is closed a contact corresponding to contact 201 is closed to apply anode potential to thyratron tubes CT and AT for preparing or enabling the tubes to be fired. These tubes are individually associated with the T.I.M. CT is scanned by the collector for providing a pulse to advance the adding machines and AT is provided to enable the start relay 205 to be operated on return of an acknowledgement pulse. Closing of a contact corresponding to 202 on any $2.00 T.I.M. connects the $2.00 input circuit of R.A.M.–1 through various elements to the cathode of tube CT. Closing of a corresponding contact on a differently valued T.I.M. connects the corresponding input circuit of R.A.M.–1 to the cathode of a tube corresponding to CT.

The thyratrons associated with the keysets may be of the type 5663 while the vacuum tubes used in other portions of the circuits may be of the type 12AU7. The type 12AU7 tube is a double triode, however, only where indicated in the drawings in one envelope are both triodes closely related in function and those triodes which are initially operated are so indicated by cross hatching.

Figure 1:
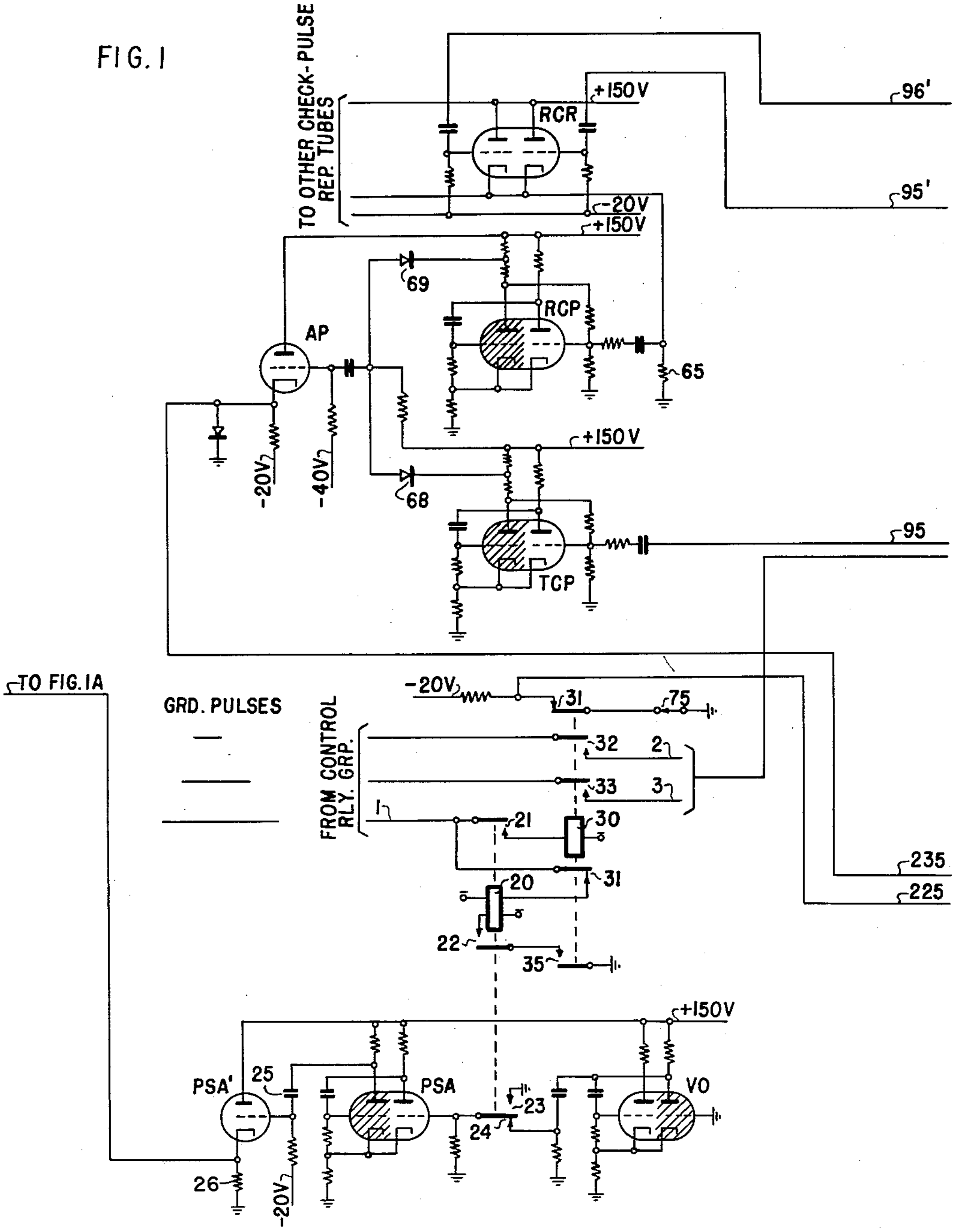

The output of the oscillator tube VO in FIG. 1 is a series of pulses of a 2000 cycle per second frequency, which are fed through a pulse shaping circuit including tubes PSA and PSA′ to advance the upper counting chain CA1–CA*n* in the collector. The first pulse causes a sequence of operations for extinguishing the right triode of the second tube CA2 in the counting chain and for firing the two tubes CY1 and CK1 connected to its right anode. The CY1 tube is maintained fired for a period of 500 microseconds hereinafter abbreviated MS while the other tube CK1 which is fired at the same instant is maintained fired for only approximately between 20 and 50 ms. The next pulse from the oscillator advances the chain to cause the tubes CY2 and CK2 connected in the right plate of the next counting tube CA3 to fire in the same manner and the other tubes CY1 and CK1 are extinguished. The upper chain is revertive and each time it is returned to the state indicated in FIG. 1a, the lower chain CB1—CBn receives a pulse and is advanced one step so that the lower chain is advanced through a complete cycle in a period of 500 ms. $(n+1)n$ where $(n+1)$ is the number of tubes in the upper chain, 500 is the time in ms. between pulses and $n$ is the square root of the number of T.I.M.'s to be used with the collector. Both the upper and lower counting chains in the collector are operated as sequential flip flop circuits and each chain is advanced one step for each respective input pulse.

The lower chain has only one tube connected to each right anode. This tube is fired only when its associated right triode is extinguished and remains fired during the time the upper chain advances through a complete cycle or a period of $500(n+1)$ms. The pairs of tubes associated with the tubes in the upper chain are cathode followers as are the tubes associated with the lower chain. Each of the cathode followers associated with the lower chain are fired sequentially in the same manner as the cathode followers of the upper chain with the exception that each is maintained fired for the period the upper chain goes through a complete cycle. The output of each pair of the cathode followers in the upper chain is connected to $n$ number of T.I.M. tubes such as CT and AT. Likewise the output of each of the cathode followers in the lower chain is connected to $n$ number of T.I.M. tubes such as CT and AT only one pair of which are in common with any pair of cathode followers in the upper chain.

Specifically, the output of cathode follower CK1 is connected to a grid of the tube CT and a total of $n$ number of tubes corresponding to CT. Cathode follower CY1 is connected to the grid of the acknowledgement tube AT and a total of $n$ number of tubes corresponding to AT, each of which is associated with one of the tubes to which the output of CK1 is connected and each of which is individual to one T.I.M. CY1 is fired for a period of 500 ms. and maintains AT and all the tubes corresponding to AT connected to CY1 prepared for this period. The output of cathode follower CZ1 is connected through a resistor network to the outputs of tubes CK1 and CY1 and the grids of tubes CT and AT only of all the pairs of T.I.M. tubes to which cathode followers CK1 and CY1 are connected. The output of CZ1 is also connected through a similar resistor network to tubes CK2—CKn and CY2—CYn and similarly to one pair of tubes corresponding to CT and AT for each associated pair of CK and CY tubes.

Firing of a CZ tube prepares each of the pair of tubes corresponding to CT and AT to which it is connected for firing. These tubes are further prepared by the sequential operation of the upper chain, however only those tubes corresponding to CT and AT which are interconnected between fired cathode followers of the upper chain and a fired cathode follower of the lower chain can be fired. Only the pair of tubes associated with one T.I.M. and corresponding to tubes CT and AT may thus be fired during any 500 ms. period. The arrangement thus described enables the use of only $(n+1)$ tubes in the upper counting chain and $n$ tubes in the lower counting chain where $n$ as before described is the square root of the number of T.I.M.'s to be used with the collector.

Now assuming contacts 202 to be closed for preparing tubes CT and AT and the tube CZ1 initially fired, as the upper counting chain advances, tubes CK1 and CY1 are fired to in turn raise the grid potential of the thyratron CT so it fires and further prepare thyratron AT. A cathode pulse is forwarded from CT over lead 241 and also contact 202 and lead 251 to the $2.00 input circuits of the T.A.M. and R.A.M.-1 respectively. This pulse is prevented from being applied to the cathode of corresponding CT tubes of the same denomination at other T.I.M.'s by rectifiers such as 222, 222', 232 and 233. All connections to the various input circuits are arranged in a similar manner. As the circuits of the T.A.M. and the R.A.M.'s are identical only the T.A.M. is shown. All pulses whether appearing at a $2.00, $5.00, $10.00, $50.00 or $100.00 input circuit of the R.A.M. and T.A.M. are shaped by the respective input circuit to form a pulse of short duration for advancing the counting chain associated therewith rapidly. The counting chain is advanced to a position corresponding to the new value and a check pulse is sent immediately on registration of the new value from both the R.A.M. and T.A.M. respectively to the acknowledgement circuit in FIG. 1. If the check pulses from the R.A.M. and T.A.M. are synchronized, a pulse is sent over the acknowledgement bus 235 to fire the still prepared thyratron AT as it remains prepared for 500 ms. and the entire registration and return of the acknowledgement pulse takes place within this period.

Each of the counting circuits or chains in the adding machines is operated as a sequential flip flop cricuit and is advanced once for each pulse. Each counting chain comprises a scale of five counter and a scale of two counter. The scale of five counters of the units, tens, hundreds and thousands counting chains are tubes V1—V5, V10—V18, V100—V140, V1000—V1400 respectively. The tens, hundreds and thousands counting chains are arranged so that the scale of five counter of each chain counts to one half of the chains total respective value before return to normal. The output of the $5.00 and $50.00 input circuits are connected directly to the scale of two counters VA and VB respectively of the units and tens chains respectively and are advanced by the respective output of the $5.00 and $50.00 pulse shaping amplifiers PS5' and PS30' while the scale of two counters VC and VD associated with the hundreds and thousands chains respectively are only advanced by a direct pulse from their respective scale of five counter. The scale of two counter associated with each chain is arranged to be operated when its associated counting chain reaches one half its total value and is returned to normal when the associated chain completes its full count. Each time a scale of two counter is returned to normal a pulse is applied to a pulse shaping circuit and then to the next higher valued counting chain to advance that chain once. The units chcain counts to the full value of ten before being returned to normal while its scale of two counter is operated on passing the half count and the counter is returned to normal on reaching ten. A pulse applied directly to the scale of two counter VA from the $5.00 input circuit leaves the first tube V1 in the units chain unchanged. The units chain is not returned to normal if the count registered is any value but 10. For example, if the count be 6, 7, 8 or 9 and a count of five is registered by changing the state of the scale of two counter VA. The state of the units chain is not otherwise changed. A check pulse is not returned to the acknowledgement circuit to enable that circuit to send a pulse to fire a prepared thyratron such as AT and operate a start relay such as 205 to enable the T.I.M. to issue a ticket until the counting chains are advanced to their ultimate position as determined by the incoming pulse.

Indicator lamps are associated with the left triodes of all the tubes of each counting chain scale of five counter and with both triodes of each scale of two counter. The left triode of the first tube such as V1, V10, V100 and V1000 of each chain is fired only when the count is zero or when the count in its particular chain is at one half the total respective count. If the count of a particular chain is advanced to or past one half its total value the state of its associated scale of two counter is reversed from that shown in FIGS. 4 and 5 and its left triode is conductive to light the lamp associated therewith while the lamp in its right triode is extinguished. Thus the value registered may be read by an observer noticing which of the lights associated with a particular scale of two counter is lighted and adding to the value it indicates the value indicated by any other lighted lamp. The units counter which is arranged to count values of two does not fire its left triodes successively in the manner of the other chains as the count advances but fires the left triodes of the odd tubes V3 and V5 first and then returns to advance the even tubes V2 and V4 of the scale of five counter. Therefore, the lamp associated with its third tube when lighted indicates a count of 2 or 7 depending on which lamp of the scale of two counter is lighted; the lamp associated with the fifth tube indicates 4 or 9; the lamp associated with the second tube indicates 1 or 6, however it can only indicate one if the tens chcains is advanced as one dollar bets are not registered in this modification and the fourth lamp when lit indicates 3 or 8 in the same manner as the second lamp indicates 1 or 6.

Figure 6:
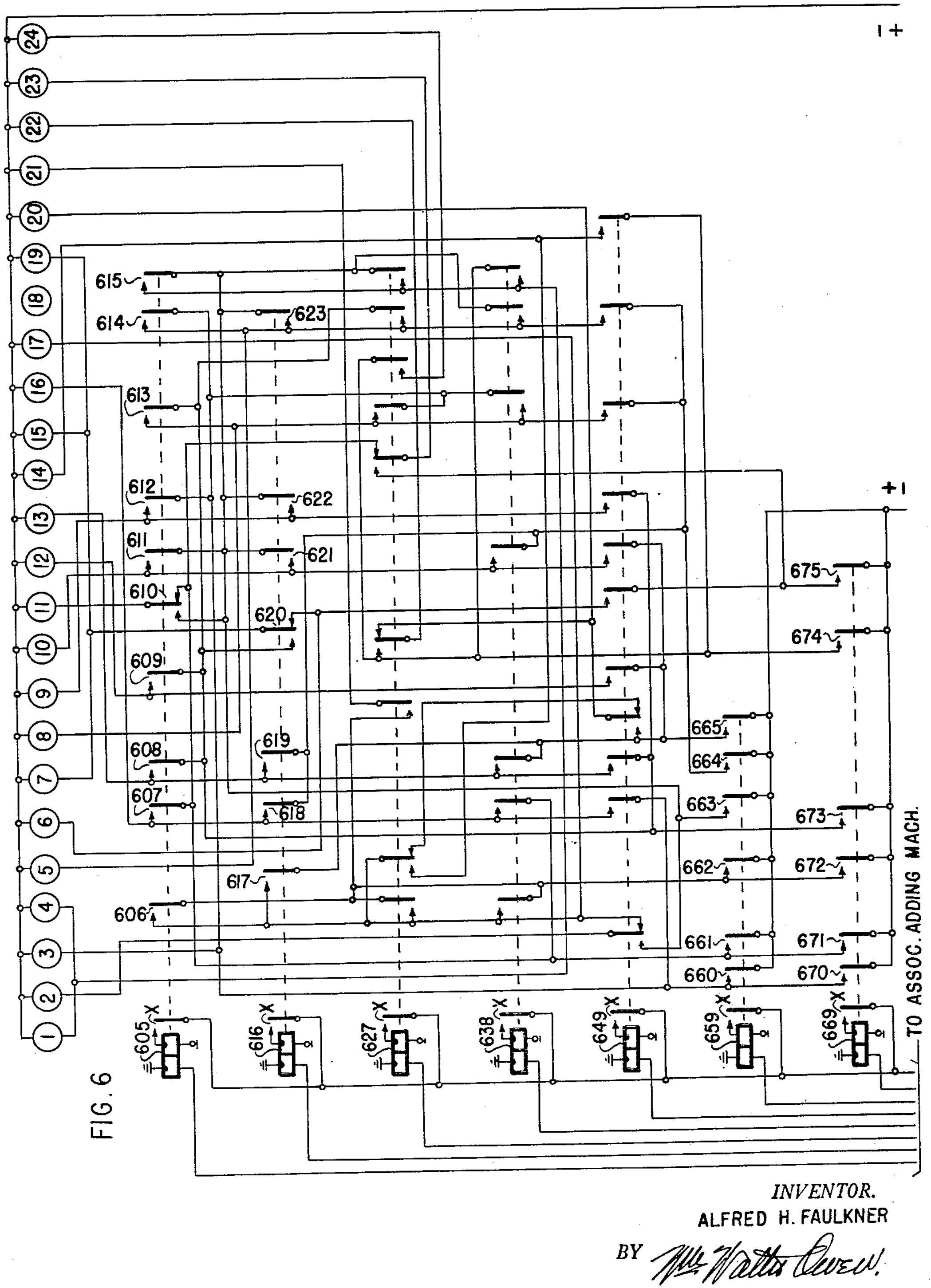
FIG. 6 is the indicator arrangement and the light panel for representing any one of digits 0–9 on the infiield display board.

The indications are periodically transferred to the infield display board, one unit of which associated with the units counting chain of the T.A.M. is shown in FIG. 6. One translating or indicator relay such as 605 is associated with each left triode of the scale of five counter and with both triodes of the scale of two counter of each chain. These relays are double wound and one winding is associated with the plate circuit of its corresponding tube. The one winding is rendered ineffective until the indications are transferred to the infield display board when a control relay associated with each chain is operated to enable this winding to be energized if its corresponding triode is conductive. The relays such as 605, 616, 627, 638, 649, 659 and 669 that are operated during the transfer operation are maintained operated by their other windings thereafter by a locking circuit completed for the other windings over their respective X contacts. These circuits are of course opened during the transfer operation to enable the relays to completely release and new combinations of relays to be operated to provide a new configuration in the display panel.

DETAILED DESCRIPTION

The totalizer operation will now be described in detail and referring first to FIG. 1, oscillator tube VO comprising a double triode, generates a square wave of a frequency of 2,000 cycles per second. Each time the anode of the right triode of tube VO swings positive the right grid of tube PSA swings positive to cause the right triode of tube PSA to become conductive and extinguish the left triode and each time the right triode of tube VO becomes conductive a negative pulse appears on the right grid of tube PSA to extinguish the right triode and cause the left triode of tube PSA to become conductive. Each time the left triode of tube PSA is extinguished a positive pulse is fed across the 100 mmf. condenser 25 to the grid of tube PSA′. Therefore, tube PSA serves as a trigger stage for cathode follower tube PSA′. Tubes PSA and PSA′ form a pulse shaping amplifier to provide sharp positive pulses across the 3K ohm resistor 26 in the cathode circuit of tube PSA′ which are fed across condenser 102 in FIG. 1*a*.

The first positive pulse across condenser 102 drives the left cathodes of tubes CA1, CA2, CA3—CA*n* positive, thereby extinguishing the left triode of tube CA1, which was the only conductive left triode of the upper chain of the collector to cause the plate of the left triode of tube CA1 to swing positive thus driving the right grid of tube CA1 and the left grid of tube CA2 positive to cause the right triode and the left triode of tubes CA1 and CA2 respectively to become conductive. The negative swing in the plate of the left triode of tube CA2 causes the grid of the right triode of tube CA2 to swing negative and thereby extinguish the right triode of tube CA2.

The second positive pulse fed over condenser 102 extinguishes the now conductive left triode of tube CA2 in the same manner that the left triode of tube CA1 was extinguished to in turn fire the right triode of tube CA2 and the left triode of tube CA3 which in turn extinguishes the right triode of tube CA3. Similarly, each succeeding pulse extinguishes the left triode of the tube that is operated and initiates the firing of the right triode of the same tube and the left triode of the succeeding tube which in turn extinguishes the right triode of that succeeding tube. The chain is revertive, so that when the last tube is restored to the state indicated, the first tube CA1 is reversed to the state indicated. Also when the left triode of tube CA*n* is extinguished, a positive pulse is fed over the 200 mmf. condenser 103 to the trigger stage PSB which performs a similar function to that of PSA. A cathode follower tube PSB′ functioning in a manner similar to tube PSA′ is associated with tube PSB and together they also act as a pulse shaping amplifier for the chain CB1—CB*n*. This chain is similar to CA1—CA*n* and will be discussed in more detail shortly.

When an operator receives a $2.00 bet for an entry to win, a contact 202 (FIG. 2) on the T.I.M.–1 keyset, corresponding to the runner adding machine R.A.M.–1 which corresponds to the particular entry and the win class, is closed by the operator. Simultaneously, common contacts 201 are closed to apply 90 volt positive potential to the anode of thyratron tube CT to prepare tube CT for firing. Contacts 201 are closed whenever any one of the keyset contacts are closed. 90 volt positive potential is also applied through T.I.M.–1 start relay 205 to the anode of the thyratron tube AT to prepare that tube for operation. Before the first pulse arrives from tube PSA; leads A1′ and A1 from collector 100 are impressed with −20 volts through their respective 2K ohm resistors 71 and 91 and lead B1 is at ground potential due to the cathode of fired tube CZ1 being raised to ground potential thereby impressing grids 209 and 210 respectively with a potential of approximately −10 volts and tubes CT and AT cannot fire. If CZ1 is extinguished and CK1 and CY1 are fired the grids are also respectively impressed with −10 volts and the tubes cannot fire. If the distributor or collector has advanced beyond tubes CK1, CY1 and CZ1 these grids are impressed with −20 volts respectively and the tubes CT and AT cannot fire.

Returning now to the distributor chain operation, and assuming that the chain is now in the condition that the left triode of CA*n* is conductive and the right triode extinguished, the next pulse from cathode follower tube PSA′ extinguishes the left triode of CA*n* in a manner similar to that previously explained and causes its anode to swing positively to thereby feed a positive pulse over 200 mmf. condenser 50 to fire the left triode of tube CA1 and over the 200 mmf. condsenser 103 to fire the right triode of tube PSB. Tube PSB is similar to tube PSA and tube PSB′ is similar to tube PSA′. Together they are also arranged as a pulse shaping amplifier to feed pulses to chain CB1—CB*n* similar in operation to CA1—CA*n*. As the left triode of CB1 is extinguished by the first pulse, the right triode is fired which causes its anode to swing negative and extinguish fired cathode follower tube CZ1 while as the right triode of tube CB2 is extinguished the cathode follower tube CZ2 is fired to raised the potential on lead B2 from −20 volts to ground potential. Lead B1 swings from ground to a −20 volts. The right triodes of the CB chain are thus each successively fired and extinguished as the lower chain advances one step for each cycle of the upper chain to in turn extinguish and fire the associated CZ tubes. Thus the CZ tubes are fired successively but each is fired only once for $n$ cycles of the upper chain and each remains fired for a period of $500(n+1)$ ms.

Figure 1A:
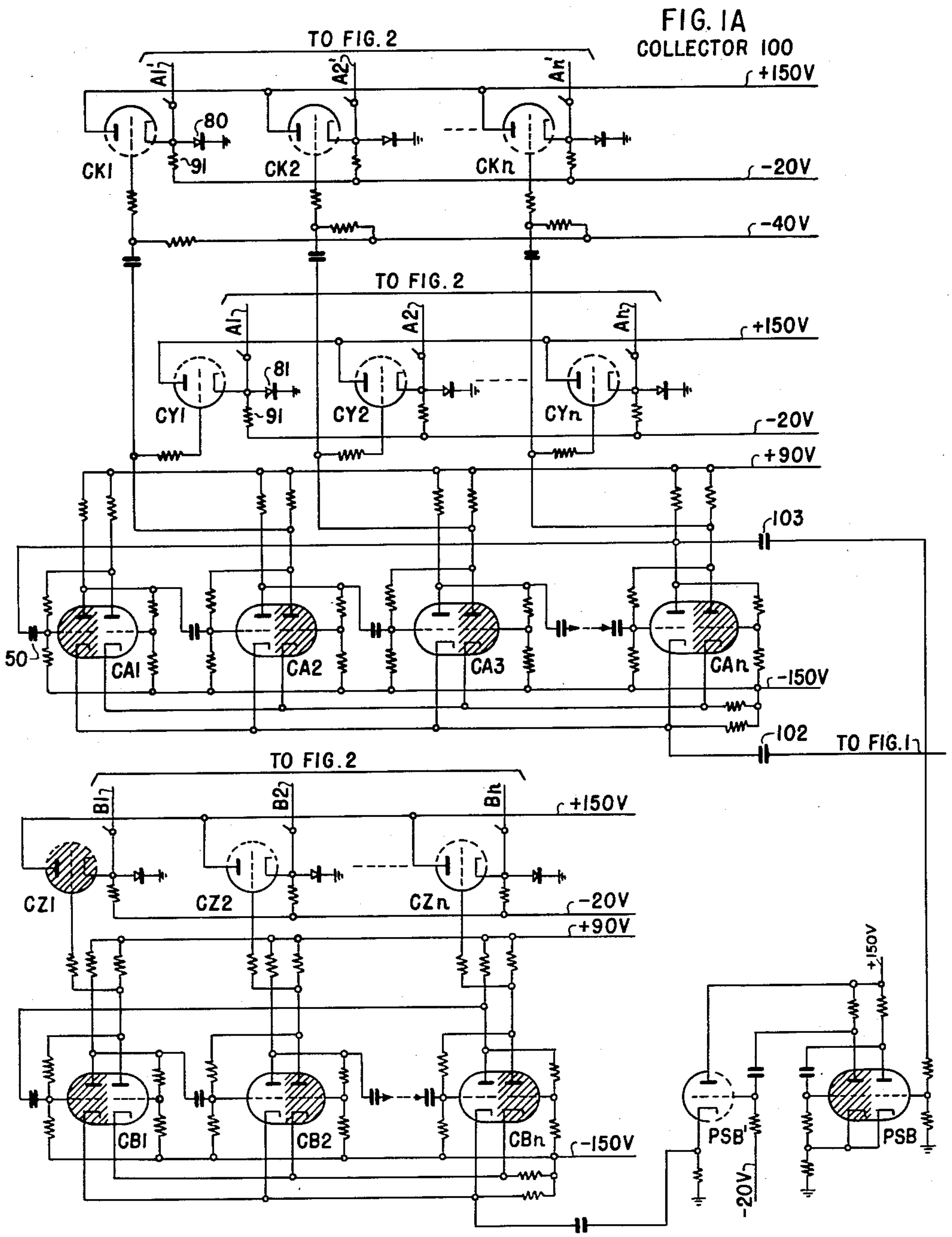

When tube CA1 is as shown in FIG. 1*a*, the first pulse thereafter supplied by the cathode follower tube PSA′ results in the extinguishment of the left triode of CA1; the firing of the right and left triodes of CA1 and CA2 respectively and extinguishment of the right triode of tube CA2 to cause the right anode of the triode tube CA2 to swing positive as previously discussed. The grids of cathode follower tubes CK1 and CY1 are each driven positive and these tubes conduct current. The grid of CY1 is directly coupled to the right anode of tube CA2 through a 1 megohm resistor as is the grid of CZ1 to CB1 while the grid of tube CK1 is coupled to the right anode of tube CA2 through a 100 mmf. condenser and a 1 megohm resistor. As tubes CK1 and CY1 are fired, leads A1' and A1 respectively are driven from a —20 volts to ground potential. Thus as the states of tubes CA2—CA$n$ are successively reversed, each pair of tubes corresponding to tubes CK1 and CY1 such as CK$n$ and CY$n$ are each in turn successively fired to bring each pair of leads corresponding to A1' and A1 from a —20 volts to ground potential. The duration of each positive pulse on leads A1'—A$n$' is about 20 ms. at the time constants of the coupling circuits of the CK tubes are each about 50 micro-seconds causing these pulses of short duration to appear on leads A1'—A$n$', each of which corresponds to the start of a 500 micro-second pulse on the corresponding A1—A$n$ lead. The voltage change on the grids of the cathode follower tubes CK1 and CY1 is far more than necessary to obtain the desired voltage change on leads A1' and A1, and therefore rectifiers such as 80 and 81 respectively are employed to limit the positive change on leads A1' and A1 respectively, thereby making the voltage limits independent of tube characteristics.

Tubes CT and AT which were previously prepared when the operator closed contacts 201 and 202 were prevented from firing by the negative potentials impressed on their respective grids. However, the right triodes of tubes CA2 and CB1 are all extinguished at the same time in at the most a period of $500n(n+1)$ ms. to fire tubes CK1, CY1 and CZ1 and drive grids 209 and 210 connected respectively through 1 megohm resistors to leads A1' and A1 and both to lead B1 through 1 megohm resistors to approximately —2 volts in a positive direction. In the event 200 positions are provided, as stated previously this period will be one tenth of a second. The duration of the positive pulse on lead A1' is approximately 20 micro-seconds and tube CT fires as grid 208 is connected to ground through the disabling bus 225, contacts 31 and the disabling switch 75. Tube AT does not fire even though lead A1 is also at approximately ground potential as grid 211 is impressed with —20 volts over acknowledgement bus 235 and the 2K ohm resistor in the cathode circuit of tube AP.

*Registration of two $2.00 bets*

When tube CT fires a potential drop of approximately 80 volts occurs across the 10K ohm resistor in the cathode circuit which is impressed across a series parallel circuit comprising a .1 mf. condenser, a .06 h. inductor and the 600 ohm resistors 306 in the grid circuit of tube PS2 in the T.A.M. and the 600 ohm resistor (not shown) in the grid circuit of a corresponding tube in the selected R.A.M.–1 machine through rectifiers 222 and 222' and leads 241 and 251 respectively. The constants of this circuit are such as to produce a damped oscillation in the absence of the rectifiers 222 and 222'. However, due to the presence of the rectifiers, the voltage which appears across the 600 ohm input resistors of the adding machines is substantially one half-cycle of a 2,000 cycle per second sine wave. Following the one half-cycle sine wave pulse, the .1 mf. condenser is charged in an aperiodic circuit which includes a 10K ohm resistor connected between the .06 h. inductor and ground. The purpose of so shaping the pulses to the adding machine is to avoid false operations from cross talk in the cables connecting the T.I.M. and the thyratron circuits with the R.A.M.'s. The constants given provide better than 25 db difference between desired signals and cross talk signals over 1,000 feet of #19 cable.

In addition to eliminating all pulsations after the first half cycle in the above oscillating circuit, the rectifiers connected therein prevent feed back between the thyratron circuits and also prevents undue shunting of the adding machine input circuits. To further reduce loading of these input circuits, the cables connected thereto are divided into groups and a rectifier common to each group such as 232, 233 and 23$n$ is connected in series with the input circuit of each adding machine for each denomination and for each entry.

Figure 3:
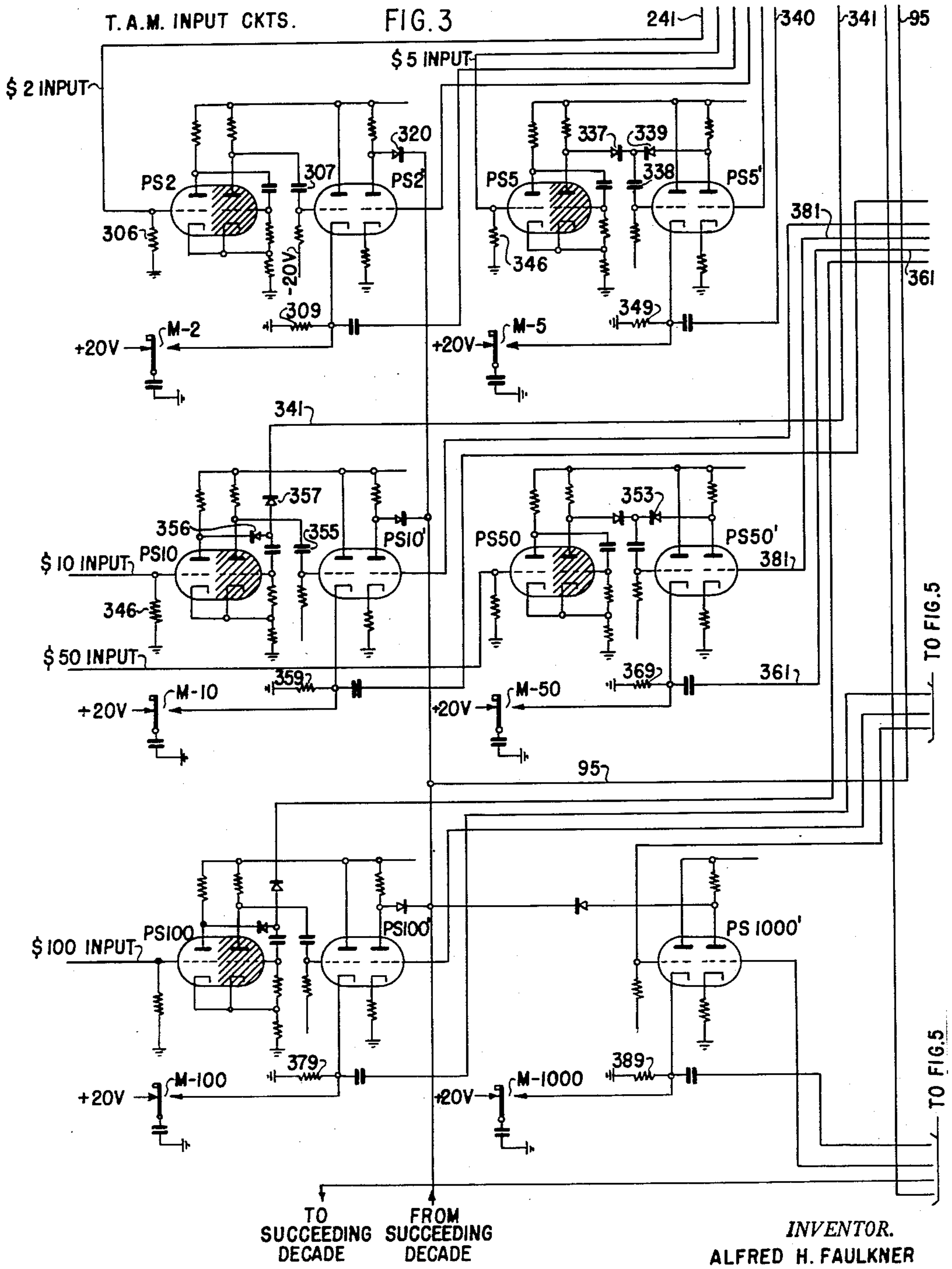
FIG. 3 is the schematic of the various denominational input pulse forming circuits of the T.A.M. machine. Similar circuits are provided for each R.A.M.

The T.A.M. is identical with the R.A.M.'s and the half-cycle sine wave pulse transmitted over lead 241 to the T.A.M. and lead 251 to R.A.M.–1 cause a count proportional to the value assigned to that input circuit (in this case $2.00) to be registered therein. Assuming this is the first bet to be registered the tubes of the T.A.M. and R.A.M.–1, indicated by the block so marked, are in the state indicated in FIGS. 3, 4 and 5. The left triode of tube PS2 is normally biased beyond cut-off by the voltage drop across the 10K ohm resistor in the common cathode circuit. Input signals of less than 8 volts peak amplitude are insufficient to cause conduction in the left triode; consequently cross talk signals, which are in the order of one to two volts peak with a 1,000 feet of #19 cable, have no effect whatever. The half-cycle sine wave pulse which appears across the 600 ohm input resistor as a result of a $2.00 collector operation has a peak amplitude of 30 volts, which is at least twice the value required to initiate conduction in the left triode of PS2. The two sections of PS2 are regeneratively coupled, thus causing the right triode to be suddenly cut-off as the input signal increases between the critical value of between 10 and 15 volts and to be suddenly fully conductive as the input signal falls below the critical value. A square wave pulse, having an amplitude independent of the input signal, is thus produced across the 20K ohm plate resistor of the right triode. This pulse has a duration of somewhat less than 250 micro-seconds, which is far too long to step the register tubes at the required rate.

In order to obtain a short pulse suitable for driving the register tubes, the trigger stage is coupled to the grid of a cathode follower through an RC circuit comprising 100 mmf. condenser 307 and the 100K ohm resistor 308 having a time constant of 10 ms. Therefore the grid of the cathode follower PS2' is temporarily driven positive at the start of the square wave pulse generated by the trigger stage and is temporarily driven negative at the end of the square wave pulse. When the grid swings positive, the cathode voltage rises sharply from ground potential to +20 volts and then decays exponentially. The duration of the cathode pulse is in the order of 10 ms. at the half amplitude level. Due to the low impedance of the cathode circuit, the shunting cathode to heater capacity of the register tubes coupled thereto has practically no effect on the pulse shape. The negative swing of the cathode follower grid at the end of the square wave pulse has no effect on the cathode circuit. This type of pulse is generated across the cathode resistor of each of the corresponding input circuit cathode followers namely the left triodes of the following tubes: PS5', PS10', PS50', PS100' and PS1000' whenever a positive pulse appears on their respective grids. All the register tubes are similarly arranged to have little effect on the cathode pulse appearing across their associated cathode follower.

The positive pulse which appears across the 3K ohm cathode resistor 309 of PS2' cuts off the left triode of tube V1 to cause the anode of the left triode of tube V1 to swing positive and drive the right grid of V1 and the left grid of V3 positive, causing their respective triodes to conduct. The negative swing of the right plate of tube V1 drives the left grid of tube V1 negative, thus keeping the left triode of V1 extinguished following the decay of the positive cathode pulse. The negative swing of the left plate of V3 drives the right grid negative, thus cutting off the right triode of V3. The positive cathode pulse tends to prevent the left triode of V3 from becoming conductive, but the positive pulse on the grid overcomes the cathode pulse. The time constant of the coupling circuit is long enough to insure that the left triode of V3 remains conductive throughout the duration of the cathode pulse, and it remains conductive, after both the cathode pulse and the grid pulse have decayed due to the cut-off of the right triode. The advance of the count in each register by means of a positive pulse from the cathode follower associated with each register results in the extinguishment and conduction of the appropriate tubes in the same manner as just described. The left grid of V5 is driven negative when the left triode of V3 becomes conductive but this has no effect as the left triode of V5 is already off. The charge on the coupling condenser 450 changes, however, the time constant of the coupling circuit is low enough to permit a charge to be completely neutralized before the arrival of another cathode pulse.

*Acknowledgement circuit operation*

A portion of the negative voltage swing applied to the right grid of V3 is transmitted through condenser 431 and rectifier 432 to the right grid of PS2′. The time constant of this circuit is 25 ms. The right triode of PS2′ operates as a Class A amplifier, hence the negative pulse applied to its grid appears in an amplified form as a positive pulse in the plate circuit. The positive pulse is transmitted through rectifier 320 over a check pulse lead 95 to the right grid of the total check pulse tube TCP in FIG. 1.

In a similar manner, registration of a pulse from the circuit of thyratron CT over lead 251 in selected R.A.M.–1 causes a positive pulse to be transmitted to the acknowledgement circuit over a corresponding check pulse lead 95′. The latter check pulse lead is applied to the right grid of the cathode follower RCR which is associated with R.A.M.–1 and causes a similar positive pulse to appear across the 10K ohm resistor 65 in the cathode circuit. The latter pulse is impressed on the right grid of a runner check pulse tube RCP. A series of tubes (not shown) each corresponding to RCR are provided for every two R.A.M.'s and one triode of each tube is individual to one R.A.M. The cathodes of all RCR tubes are commonly connected to resistor 65 so that any pulse arriving from an R.A.M. over a lead corresponding to 95′ or 96′ will appear across resistor 65 and be impressed on the right grid of tube RCP.

The circuits in which the RCP and TCP tubes are connected are each arranged to produce a 50 volt positive pulse of approximately 100 ms. duration in the plate circuit of each left triode in response to a short positive pulse on the grid of each right triode. As the right triodes are normally extinguished they become conductive to extinguish their respective left triodes and when the pulse on each right grid decays, the respective right triodes are cut-off and the left triodes again become conductive. The pulses received from the T.A.M. and R.A.M.–1 are not necessarily concurrent but they will not be displaced by more than 10 or 20 ms. Hence the positive output pulses of the RCP and TCP tubes overlap for a duration of at least 80 ms. and prevent rectifiers 68 and 69 respectively from shunting the +150 volt plate supply of tubes RCP and TCP from the grid of tube AP for the aforementioned period. Neither of these +50 volt output pulses alone is sufficient to enable the change of voltage on the grid of tube AP to fire the tube but during the period when the pulses overlap as a result of a synchronized input pulse, the grid of tube AP is driven sufficiently positive to cause the tube to fire. The cathode of tube AP consequently then swings from −20 volts to slightly positive to send a positive pulse over acknowledgement bus 235 thereby firing the acknowledgement thyratron AT as grid 211 swings to a slightly positive value. Thyratron AT fires as the positive pulse on lead A1 is of a duration of 500 ms. and is therefore still effective. Tube AP extinguishes as the positive pulse on its grid decays as the left triodes of tubes TCP and RCP again become conductive. Firing of thyratron AT results in the operation of T.I.M.–1 start relay 205 to enable the machine to issue a ticket to the bettor corresponding in amount to the value of the bet; to the entry and the win class or pool. Relay 205 may require as long as 10 milliseconds to operate by which time the distributor may be advanced to T.I.M.–20, but this is immaterial as no more counts can be registered by the associated T.I.M.–1 until the collector tubes are extinguished and the .1 mf. condenser 215 discharged. Relay 205 also opens contacts 201 and 202 to thus extinguish the thyratrons CT and AT. Until start relay 205 is operated a second collector operation cannot be performed at T.I.M.–1 as thyratron tube CT is fired, thus preventing the sending of another pulse to advance the register tubes of the adding machines until the acknowledgement tube is fired to operate relay 205. This prevents further registration of any count from the associated T.I.M. until acknowledgement is made of the registration.

*Further $2.00 registrations*

Another $2.00 bet to win on the same entry placed at the same T.I.M. or another T.I.M. gives rise to a sequence of operations similar to that previously described for the first $2.00 bet and results in another positive pulse appearing across the 3K ohm resistor 309 in the cathode of the left triode of PS2′. The left triode of tube V3 is now extinguished, thereby causing the right grid of tube V3 to swing positive and therefore the right triode of tube V3 becomes conductive. As the left anode of tube V3 swings positive the left grid of V5 also swings positive to cause the left triode of tube V5 to become conductive. The negative charge on condenser 450 occurring when the left triode of V3 became conductive has by this time decayed. As the left triode of V5 becomes conductive condenser 451 acquires a negative charge, however the left triode of V2 is already shut off and as the time constant of condenser 451 is the same as condenser 450 this charge quickly decays. The left triode of V5 becomes conductive and its anode swings negative to transmit a negative pulse through condenser 461 and rectifier 462 to the right grid of tube PS2′ which acting has a Class A amplifier reproduces this pulse as a positive pulse in its plate circuit from whence it is transmitted over rectifier 320 and check pulse lead 95 to the right grid of the TCP tube. In the meantime a similar pulse over lead 95′ from R.A.M.–1 is transmitted to the right grid of tube RCR or over a corresponding lead from another R.A.M. to the grid of its associated RCR triode. A sequence of operation takes place as described for the first $2.00 acknowledgement and a pulse is transmitted over acknowledgement bus 235 to render tube AT or a corresponding tube associated with another T.I.M. conductive to thereby enable the start relay such as 205 to operate and complete the issuance of a ticket.

A third $2.00 bet on the same entry to win is treated in the same manner and the input pulses applied to R.A.M.–1 and to the T.A.M. cause the described sequence of operations for tube PS2 and PS2′. The positive pulse appearing across resistor 309 now extinguishes the left triode of tube V5 causing a positive pulse to be transmitted from its plate over condenser 451 to the left grid of tube V2 to thereby cause the left triode of tube V2 to fire. The right grid of tube V5, connected to the left plate of tube V5, also swings positive causing the right triode of tube V5 to fire and hold the left triode of V5 extinguished. The left triode of V2 on firing extinguishes its counter part triode. Conduction in the left triode of V2 causes its plate to swing negative thereby applying a negative charge to condenser 453 connected to the left grid of tube V4 which decays rapidly as condenser 453 is similar to condensers 450 and 451, and as the left triode of V4 is already extinguished there is no effect. A negative pulse however is also transmitted over condenser 424 and rectifier 422 to the right grid of tube PS5′ which also acts as a Class A amplifier in a manner similar to tube PS2′ and reproduces the negative pulse as a positive pulse in its plate circuit which pulse is transmitted across rectifier 339 and condenser 338 in a circuit having a time constant of 10 ms. to the left grid of the same tube to cause it to become temporarily conductive and to produce a sharp positive pulse over the cathode resistor 349 similar to that produced over cathode resistor 309. Rectifier 337 blocks the positive pulse appearing across rectifier 339 from the right plate of tube PS5. The pulse produced across resistor 349 is transmitted over lead 340 and applied to the cathodes of tube VA which is connected as a scale of two counter to extinguish the right triode of tube VA. As the right triode of tube VA is extinguished its plate swings positive to in turn raise the potential of the left grid of tube VA to thereby overcome the cathode pulse and cause the left triode to become conductive. The time constant of the grid plate coupling circuits are long enough to maintain the left triode conductive throughout the duration of the cathode pulse and yet short enough to allow the charge on the coupling condensers to become adjusted to the changed state before the cathodes are again pulsed positive. A positive pulse transmitted over 200 mmf. condenser 489 and 100K ohm resistor 490 and lead 341 is prevented from being applied to the grid of the right triode of tube PS10 because of rectifier 357. The negative pulse caused in the left anode of tube VA as the left triode becomes conductive is applied to the grid of the right triode in a manner similar to that already described for further preventing conduction in that triode and is also applied over the 100 mmf. condenser 492, through rectifier 493 to the right grid of class A amplifier PS2′ from whence a series of operations takes place similar to that already described to thereby enable the issuance of a ticket at the T.I.M.

The fourth bet of $2.00 on the same entry to win is processed in a manner similar to that already explained and the positive pulse produced across resistor 309 effects extinguishment of the left triode of tube V2 to in turn cause its anode to swing positive thereby enabling the right triode to become conductive and also the left triode of tube V4. As the left triode of tube V4 becomes conductive, it extinguishes its right triode in a manner similar to that already explained and transmits a negative pulse across rectifier 472 which is applied to the right grid of tube PS2′. The sequence of operations is then as previously described and the start relay 205 is operated to enable the issuance of a ticket.

The fifth bet of $2.00 on the same entry to win is transmitted to the register tubes in a manner similar to that described to again cause a positive pulse to appear across resistor 309 which now extinguishes the left triode of tube V4 to in turn cause its right triode to become conductive and also transmits a positive pulse across 200 mmf. condenser 410 to the left grid of tube V1 so that it becomes conductive and extinguishes its right triode. The units counting chain is now returned to the state indicator in FIG. 4. When the left triode of tube V1 becomes conductive a negative pulse is transmitted from its plate to the left grid of tube V3, which is already extinguished, across condenser 441 which is similar to condenser 450, 451 and this negative pulse decays very rapidly. The negative pulse which is transmitted across the 250K ohm resistor 411 to extinguish the right triode of tube V1 is also transmitted across one of the two 50K ohm resistors in the right grid circuit of tube V1, the 100 mmf. condenser 418 and rectifier 412 in a manner similar to that described for the transmission of the negative pulse when the left triode of tube V2 became conductive to the right grid of tube PS5′. As already explained, this pulse appears as a positive pulse in the plate circuit of tube PS5′ from whence it is transmitted over rectifier 339 and condenser 338 to the left grid of tube PS5′ to cause a positive cathode pulse to appear across resistor 349 in a manner already explained which is applied over lead 340 to the cathodes of tube VA to extinguish the now operated left triode and cause its respective plate circuit to swing positive thereby initiating conduction in its right triode and returning the scale of two counter VA of the units counting chain to normal. The plate of the now conductive right triode of tube VA swings negative to transmit a negative pulse to the left grid of tube VA to further prevent conduction in the left triode and also over condenser 489, resistor 490, lead 341, rectifier 357 to the right grid of tube PS10 to temporarily extinguish the right triode of PS10 thereby causing its plate to swing positive and transmit a positive pulse across condenser 355 to the left grid of tube PS10′ to cause the left triode of tube PS10′ to become temporarily conductive. Blocking rectifier 356 prevents the pulse transmitted over rectifier 357 from being applied to the left anode of PS10. PS10′ is arranged in a circuit similar to PS2′ and a positive cathode pulse produced across resistor 359, similar to that produced across resistor 309, extinguishes the left triode of tube V10. In this manner every restoration to normal of tube VA causes a positive pulse to appear across the cathode resistor 359 to be applied to the tens register tubes and advance their count once. The right anode of tube V10 swings positive to apply a positive pulse to the right grid of tube V10 to overcome the cathode pulse and cause the right triode to become conductive and across condenser 496 to the left grid of tube V12 to cause its left triode to become conductive to in turn extinguish the right triode of tube V12. The positive pulse transmitted over condenser 496 to the right grid of PS50′ from the left anode of V10 is reproduced as a negative pulse in the plate of PS50′. However rectifier 353 is arranged to block it and it decays before other pulses are introduced. The circuit including the condenser coupling the left anode of tube V12 and the left grid of tube V14 has a short time constant and the negative change on it decays rapidly. The negative pulse appearing in the plate circuit of the left triode of tube V12 is fed across part of the resistor 497, condenser 498 and rectifier 499, to the right grid of tube PS10′. The right triode of tube PS10′ acts in a manner similar to that described for the right triode of tube PS2′ to transmit a positive pulse over check pulse lead 95 to the right grid of the TCP tube. At the same time a pulse is being transmitted over lead 95′ from R.A.M.–1 to the right grid of tube RCR to cause the same sequence of operations as previously described to enable the issuance of a ticket.

*A $5.00 registration*

A $5.00 bet on the same entry to win its processed from another T.I.M. (not shown) which is connected between the distributor and the $5.00 input circuit of R.A.M.–1 and the T.A.M. in the same manner as shown for T.I.M.–1 and the $2.00 input tubes of the adding machines. The connections to the adding machines are over leads corresponding to 241 and 251, so that when the tube corresponding to CT associated with the T.I.M. machine at which the $5.00 bet is placed fires, a pulse of the same nature as was described as appearing over the $2.00 input leads 241 and 251 now appears on the $5.00 input lead of R.A.M.–1 and the T.A.M. The description of the T.A.M. operation follows and as mentioned before the operation will be the same for R.A.M.–1.

Figure 4:
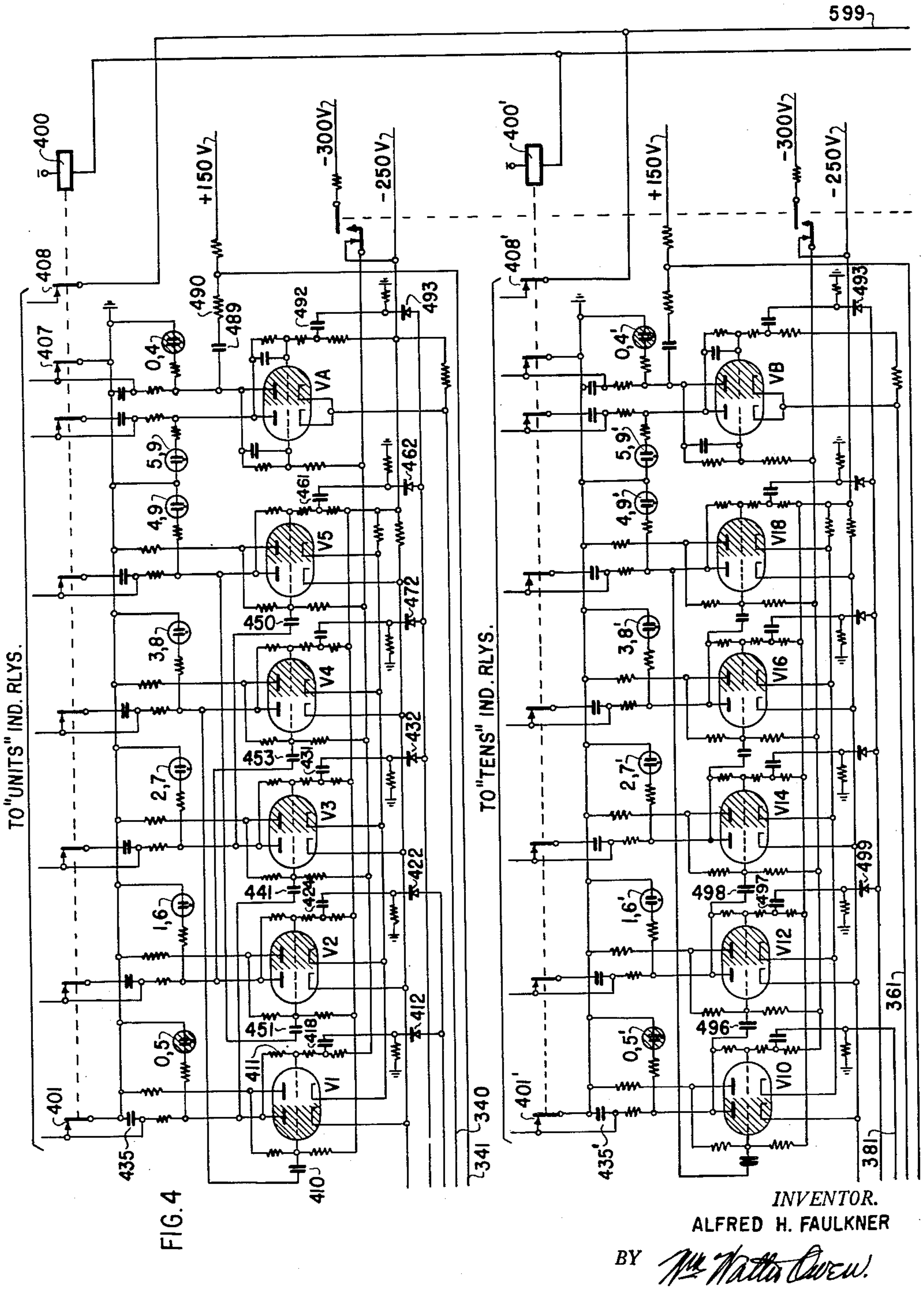
FIGS. 4 and 5 are the units, tens, hundreds and thousands counting circuits respectively of the T.A.M. lamp indicators such as 0, 5—0, 4 are associated with each of the counting circuits to provide an indication of the count registered in each particular counting circuit. Each of the R.A.M.'s contains duplicate circuits arranged as shown in FIGS. 3, 4 and 5.
Figure 5:
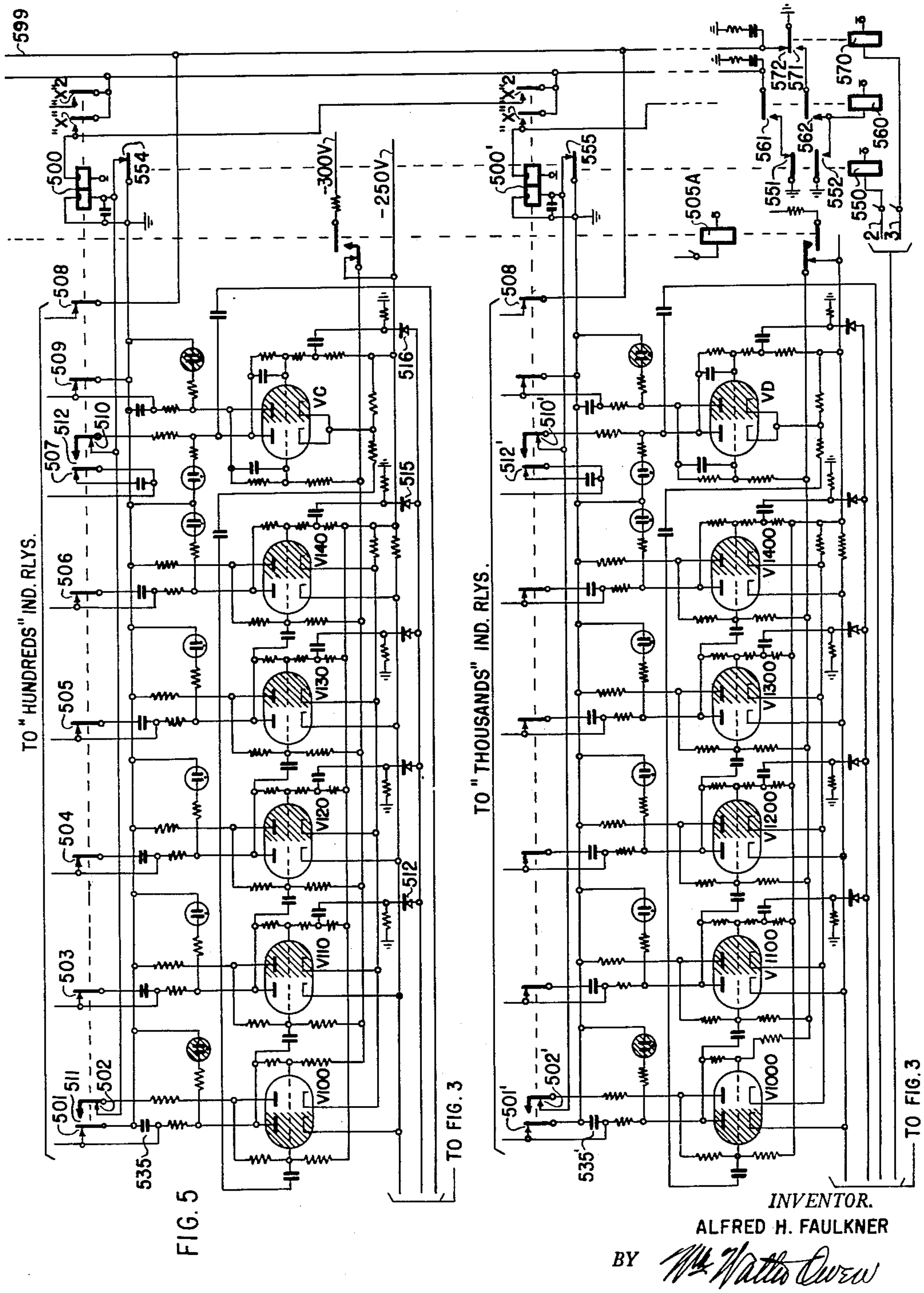

The half-cycle sine wave input pulse appearing across the 600 ohm input resistor 346 in the left grid circuit of PS5 of the T.A.M. causes the left triode of PS5 to become conductive and temporarily extinguish its counter part triode in the same manner as has been described for tube PS2. As the right anode swings positive, a pulse is transmitted over rectifier 337 and condenser 338 to the left grid of the cathode follower PS5′. Rectifier 337 is positioned to prevent positive pulses which appear in the plate circuit of the right triode of PS5′ from appearing in the right plate of PS5. The left triode of PS5′ is rendered temporarily conductive to produce a positive pulse across cathode resistor 349 similar to that already described for resistor 309. The pulse appearing across resistor 349 is transmitted directly to the cathodes of tube VA to extinguish the right triode, if the registered count has not been advanced to 5 previously. This results in rendering the left triode of VA conductive as has been described and the transmission of a negative pulse over condenser 492 and rectifier 493 to the right grid of tube PS2'. Assuming that no other amounts have been registered and all tubes are as indicated in FIG. 4 except that tube VA is reversed, the count now corresponds to five. A similar pulse appears on the grid of the corresponding tube in R.A.M.–1. A positive pulse is then generated in the plate circuit of tube PS2' and the plate circuit of its corresponding tube in R.A.M.–1 and each is transmitted to the acknowledgement circuit over their respective check pulse leads 95 and 95'. The sequence of operation which takes place is as already described, and the acknowledgement pulse is sent over bus 235 cause the operation of a tube corresponding to AT and its associated relay corresponding to relay 205 so that the particular T.I.M. may issue a $5.00 ticket to win on the particular entry.

Assuming at the time the cathode pulse from tube PS5' is applied to register tube VA that the left triode of V3 is the only conductive left triode. This corresponds to a $2.00 registration. When the left triode of tube VA becomes conductive the count corresponds to seven. The acknowledgement pulse is sent as described for enabling the issuance of a ticket. Nothing further occurs in the conductivity of the various tubes and the left triodes of tubes V3 and VA are fired as described at the end of the cathode pulse.

When only the left triode of tube V5 is conductive, corresponding to a count of four, at the time that the cathode pulse is applied to the cathodes of tube VA no change in the condition of the various tubes takes place beyond that already indicated for tube VA so that the count now corresponds to nine. The check pulse is transmitted as already described to the acknowledgement circuit and the described sequence of operation takes place.

Assuming the left triodes of tubes V2 or V4 and VA are conductive, corresponding to a count of six or eight, at the time the cathode pulse is applied to tube VA. The state of tube VA is reversed to that shown in FIG. 4 as previously described to extinguish the left triode of VA and render the right triode conductive. The negative pulse appearing in the right plate of tube VA is transmitted across condenser 489, resistor 490, lead 341, rectifier 357, to the grid of the right triode of PS10 to result in the already described sequence of operation for advancing the count of the tens register tubes to V12 or if the count has already reached V12 to the next tube in a manner similar to that described for advancing the count from tube V10 to V12 and for thereafter transmitting a negative pulse over a rectifier such as 499 to enable the right triode of PS10' to send a check pulse to the acknowledgement circuit from which a pulse is sent if a synchronized check pulse arrives from the R.A.M. to enable the operation of the T.I.M. in a manner similar to that described. The count now corresponds to one or three plus the value registered in the tens register tubes dependent on whether the left triode of tube V2 or V4 is fired.

If the count already is at one or three at the time the $5.00 pulse is applied to the cathodes of tube VA, the left triodes of tubes V2 and V4 and the right triode of VA are conductive. The right triode of VA is extinguished to initiate conduction in the left triode of VA. A negative pulse is then sent over rectifier 493 to result in a series of operations already described for enabling the issuance of a ticket from the T.I.M. Thus reversal of the state of VA in either direction does not affect the conductivity of other tubes in the units counting chain.

*Operation of other counting chains*

Registration of a $10.00 bet from the proper T.I.M. takes place in a manner similar to that described for the $2.00 bet and results in the temporary firing of the left triode of tube PS10 and its corresponding tube in R.A.M.–1 or another R.A.M. The negative swing in the left triode of PS10 is transmitted across blocking rectifier 356 to extinguish the right triode causing its plate to swing positive and transmit a positive pulse across condenser 355 to the left grid of cathode follower PS10'. The pulse then appearing across resistor 359 is similar to that appearing across resistor 309 and is similarly applied to the left cathodes of all the tens register tubes to extinguish the operated left triode and render the counter part triode of the extinguished triode and the left triode of the succeeding tube conductive in a maner already explained. A negative pulse is transmitted when a left triode is fired over a condenser corresponding to 498 and a rectifier corresponding to 499 to the right grid of tube PS10' in a manner already explained for tube V12. The series of operations thereafter is similar to that already explained for the acknowledgement circuit, acknowledgement thyratron and the start relay.

Every time tube VA is restored to normal or a pulse is introduced from the appropriate T.I.M. into the trigger stage of the $10.00 input circuit, the count of the tens register tubes is advanced to the succeeding tube. Thus, when the left triode of tube V12 is fired, the count corresponding to 10; when conductive, the left triode of V16 corresponds to 30 and the conductive left triode of V18 corresponds to 40. A pulse applied from cathode resistor 359 to the cathode of the tens register tubes when the left triode of tube V18 has fired extinguishes the left triode of V18 to cause its right triode to become conductive and it also transmits a positive pulse back to the left grid of tube V10 to restore it to the state shown in FIG. 4. When the left triode of tube V10 is rendered conductive a negative pulse is transmitted over lead 381 to the right grid of PS50' and a sequence of operations takes place similar to that described when the left triode of V1 was fired to transmit a negative pulse over resistor 411, condenser 418 and rectifier 412. Tubes PS50 and PS50' are arranged in circuits similar to that already described for PS5 and PS5' so that a pulse of short duration is made to appear over cathode resistor 369 similar to that already described for 349 from whence it is applied over lead 361 to the cathodes of tube VB arranged as a scale of two counter in a circuit similar to that described for tube VA to now cause tube VB to reverse its state. Transmission of a negative pulse to enable the right trtiode of tube PS10' to transmit a check pulse to the acknowledgement circuit takes place when the left plate of tube VB swings negative to transmit a negative pulse over rectifier 493' corresponding to rectifier 493. After transmission of the check pulse an already described sequence of operation takes place and the appropriate T.I.M. machine issues a ticket.

As the registration of $10.00 tickets proceeds or each time tube VA is restored to normal, positive pulses are produced across resistor 359 as already explained to advance the count of the tens register tubes to V18 again. As the left triode of VB and V18 are now conductive the count in the tens register tubes corresponds to ninety. The next pulse applied to the cathode of the tens register tubes extinguishes the left triode of tube V18 to again initiate conduction in the left triode of tube V10 which extinguishes the right triode of V10 and transmits a negative pulse to the right grid of tube PS50'. A cathode pulse is then produced across resistor 369 in a manner similar to that already explained, when a negative pulse was transmitted from the left plate of either tubes V1 or V2 to the right grid of tube PS5', to extinguish the now conductive left triode of tube VB and restore VB to the state indicated in FIG. 4. A $50.00 bet also has the result of producing a pulse across resistor 369 in a manner similar to that already explained and it is also applied directly to VB over lead 361 to reverse the condition of VB from whatever state it is in and cause it to transmit a pulse if its left triode becomes conductive over rectifier 393' and initiate a sequence of operations already described for issuance of a ticket. When the right plate of VB swings negative a negative pulse is transmitted over a circuit similar to that already described for transmitting a pulse from the right plate of tube VA to the right grid of tube PS10. The reversal of the state of VB, thus has no effect on the state of its associated counting chain. The pulse from the right plate of tube VB is transmitted to the right grid of tube PS100 to initate a sequence of operation already described when a negative pulse was transmitted from the right plate of tube VA to the right grid of tube PS10.

As tubes PS100 and PS100' are arranged in a circuit similar to PS10 and PS10' to produce a positive pulse of short duration across the resistor 379 in the left cathode of tube PS100' similar to those already described for similar resistors. This pulse extinguishes the left triode of tube V100 to cause conduction in its counter part triode and the left triode of tube V110. The count of the hundreds register tubes is advanced in exactly the same way as described for the tens register tubes on the registration of 100 dollar bet or each time the tube VB is restored to the state indicated in FIG. 4.

When the left triode of tube V120 is fired the count is advanced to 200 and when the left triode of tube 130 is fired the count is advanced to 300. The firing of the left triode of tube V140 advances the count to 400. Whenever the left triode of a particular tube V110—V140 becomes conductive a negative pulse is transmitted across its associated rectifier 512—515 respectively to the right grid of tube PS100'. After this a sequence of operations takes place as already described for PS10' and PS2' to enable the appropriate T.I.M. machine to issue a ticket.

Transmission of a cathode pulse from resistor 379 corresponding to a fifth 100 registration extinguishes the left triode of tube V140 to cause its right triode to become conductive. When the left plate of V140 swings positive, a positive pulse is transmitted to the left grid of tube V100 to restore that tube to the state shown in FIG. 5 and the cathodes of tube VC to reverse the condition of that tube from the state shown in FIG. 5. A negative pulse over rectifier 516 applied to the right grid of PS100' results in a series of operations similar to that already described for issuance of a ticket.

Introduction of positive pulses from resistor 379 again advances the count of the hundreds register tubes. When the left triodes of tubes V140 and VC are conductive, corresponding to a count of 900, a pulse then introduced extinguishes the left triode V140 and tubes V100 and VC are restored to the state indicated in FIG. 5. A positive pulse is now transmitted from the right plate of tube VC over lead 590 to the left grid of tube PS1000'. Tube PS1000' is arranged to produce a pulse across its cathode resistor 389 similar to that produced across resistors 309 etc., to advance the count of the thousands register tubes V1000—V1400 and VD which are arranged in circuits similar to that described for the hundreds register tubes. Succeeding groups of register tubes may be provided and interconnected in a manner similar to that shown for registering higher counts, however this is not necessary for describing the operation of this invention.

*Indicator arrangement*

Indications of the count are provided at each of the R.A.M.'s, and at the T.A.M.'s. The count at the runner adding machines is individual to the entry and the pool and is read in the same manner as the count of the T.A.M. Thus to read the values indicated by the units register tubes one need only glance at the lamps directly above the tubes. When the left triode of V1 is conductive and all other tubes have their right triodes conductive, the count registered in the units tubes is then equal to 0 and lamps 0,5 and 0,4 are lighted. These lamps are in the plate circuits of the left triode of V1 and the right triode of VA respectively. If the left triode of VA is conductive, the count registered is five and lamps 0,5 and 5,9 are lit. When the left triode of V2 is conductive and the right triode of VA is conductive the count registered in the units tubes is one and lamps 1,6 and 0,4 are lighted. If the left triode of V2 and the left triode of VA are conductive lamps 1,6 and 5,9 are lighted and the count is read at six. When the left triode of V3 is conductive and the right triode VA is conductive lamps 2,7 and 0,4 are lighted and the count is read as two. If the left triode of VA is conductive, lamp 5,9 is lighted instead of 0,4 and the count is seven. When the left triode of V4 is conductive and the right triode of VA is conductive, lamps 3,8 and 0,4 are lighted to indicate a count of eight. If the left triode is conductive lamp 5,9 is lighted instead of 0,4 and the count is read as three. When the left triode of V5 and the right triode of VA are conductive lamps 4,9 and 0,4 are lighted to indicate a count of four. If lamp 5,9 is lighted instead of 0,4 the count is read as nine.

Turning now to the tens register tubes it will be noticed that a lamp arrangement is provided for the tubes and the indications given by the lamps are similar to that of the lamps associated with the units tubes and when lighted are as follows: 0,5' and 0,4' equal 0; 1,6' and 0,4' indicate a count of 10; lamps 2,7' and 0,4' indicate a count of 20; lamps 3,8' and 0,4' indicate a count of 30; lamps 4,9' and 0,4' indicate a count of 40; lamps 0,5' and 5,9' indicate a count of 50. Lamps 1,6', 2,7' and 4,9' respectively when lighted in combination with lamp 5,9' indicate counts of 60, 70, 80 and 90 respectively. The lamps of the hundreds register tubes and the lamps of the thousands register tubes are arranged to indicate the count registered in their respective register tubes in the same manner as the lamps of the tens register tubes indicate the value of the count registered in those tubes.

The infield display board as stated before comprises a number of groups of lamp indicators. Each group consists of 24 lamps, arranged as shown in FIG. 6 and so operated that particular combinations of lighted lamps of the 24 lamps form a digit indication. As the groups of lamps for the units, tens, hundreds and thousands digits are each operated in the same manner, only the manner of lighting the units lamps in accordance with a particular registered count will be explained. The indicator or translating relay group 605, 616, 627, 638, 649, 659 and 669 shown in FIG. 6 is individual to the units lamps of the infield display board and to the units register tubes of the T.A.M. Each has one winding connected in parallel with a corresponding indicator lamp at the T.A.M. and is normally shunted to prevent energization of that winding except when the count is transferred by opening of contacts 401—407. The registration of a total at the infield display board is done every ninety seconds by sending out a series of ground pulses from a relay pulse arrangement or a cam pulse arrangement of any well-known type which produces pulses of the relative duration over their respective associated leads as shown in FIG. 1.

The first pulse over lead 1 completes a circuit over contacts 34 to battery through the upper winding of relay 20. Relay 20 operates and closes contacts 21, 22, 23 and opens contact 24. Closing of contacts 23 grounds the right grid of tube PSA to prevent its firing while opening of contacts 24 prevent the output of oscillator tube VO from being fed to PSA. Contacts 21 on closing complete a circuit for relay 30 to the ground pulse over lead 1. Relay 30 operates to close a locking circuit for the lower winding of relay 20 over contacts 35 and 22 and opens the circuit for the upper winding of relay 20 at contacts 34. It opens contacts 31 to place a full —20 volt potential on grid 208 of tube CT over conductor 225 and the corresponding grids of other collect thyratrons to prevent their firing. Contacts 32 and 33 are closed to enable the forwarding of pulses having the time relationship shown in FIG. 1 over leads 2 and 3 respectively to relays 550 and 570 (FIG. 5) respectively. Relay 570 operates first as the pulse over lead 3 arrives first and it closes contacts 571 to prepare a locking circuit to relay 560 and opens contacts 572. Opening of contacts 572 removes ground from lead 599, lock lead 699 and leads corresponding thereto associated with the tens, hundreds and thousands indicator relays respectively to deenergize the right winding of any operated indicator relays and cause the lamp indicators associated therewith to be extinguished.

When the last pulse arrives over lead 2, relay 550 is operated to open contacts 551 and close contacts 552. Closing of contacts 552 completes a circuit to relay 560 which closes contacts 561 and 562 to complete its previously prepared locking circuit over contacts 571. Relay 550 also opens contacts 554 and 555 to remove the shunts from the left windings of relays 500 and 500' respectively to cause these relays to operate over respective circuits including ground, the left winding of relays 500 and 500' respectively, contacts 510 or 502 in the case of relay 500 and 510' or 502' in the case of relay 500' through the conductive right triode of V100 or the conductive left triode of VC in the case of relay 500 and the right triode of V1000 or left triode of VD in the case of relay 500'. These relays are not operated if the respective associated triodes of V100 and VC and V1000 and VD are non-conductive as the count in each associated chain is zero. An indication need not be made at the display board, therefore unless the next higher valued counting chain has a registration therein which in this case if the hundreds chain is at zero and the thousands chain has a registration, the digit zero is displayed in the hundreds light panel and relay 500 is operated as will be explained.

The left windings of relays 500 and 500' are therefore operated if one of the previously mentioned respective triodes are conductive and they close only their respective X contacts to prepare circuits to their own right winding and the right winding of the relay associated with any lower valued chain. A moment later when the pulse on lead 2 is over, relay 550 releases to close contacts 551. The circuits to the left windings of relays 500 and 500' are again shunted at contacts 554 and 555 respectively, however the right winding of relays 500 and 500' are operated over their respective X contacts and contacts 561 and 551. Now, if relay 500 was not operated and relay 500' is operated a circuit is completed to relay 500 over contacts 551, 561 and contacts "X" 2 of relay 500' to operate the right winding of relay 500 so that it may remove the shunts from its indicator relays. Relay 500' associated with the thousands counting chain may be operated in the same manner if its counting chain registers zero and the next higher valued chain has a registration therein. The "X" 2 contacts associated with relay 500 may be used in the same manner for a lower valued counting chain. When the right windings of relays 500 and 500' energized, contacts 501—510 and 501'—510' respectively are opened to remove the shunts from their corresponding indicator relays so that their left windings are energized if their associated triodes are conductive to enable them to operate the associated lamps in a manner that will be explained. Another point in the circuits to the right windings of the associated indicator relays is opened at contacts 508 and 508' respectively. Relays corresponding to relay 659 of the hundreds and thousands indicator relays respectively are not connected to the left plate circuit of tubes VC and VD respectively until the right windings of relays 500 and 500' respectively are operated. Condensers such as 435, 435' and 535 and 535' are provided in the plate circuits of all register tubes with which any relay is associated to shunt the impedance of the relay initially so as to prevent the impedance from changing the count registered in any of the tubes. Relay 560 remains operated over its locking circuit when contacts 552 open.

A circuit is also completed when relay 550 releases over contacts 551 and 561 to relays 400 and 400' which are associated with the units register tubes and the tens register tubes respectively. Relays 400 and 400' open their respective contacts associated therewith 401—408 and 401'—408' to remove the shunts from the left windings of the indicator relays connected in the plate circuit of the units register tubes and the tens register tubes respectively to operate the left windings of relays connected to triodes which are fired. The operated left windings of the indicator relays of all the register tubes close only their "X" contacts.

As the pulse over lead 3 comes to an end, relay 570 releases and contacts 571 open to in turn release relay 560 which opens contacts 561 and 562. Opening of contacts 561 opens the circuits for the right windings of relays 500 and 500' and the operating circuits for relays 500 and 400' and all release to restore the original circuits for shunting their respective indicator relays. Contacts 572 are closed before release of relay 560 to prepare energizing circuits for the right winding of any indicator relay which has closed its "X" contact.

As relays 400, 400', 500 and 500' release to close contacts 408, 408' 508 and 508' respectively, the energizing circuits to the right windings of their respective indicator relays are completed over contacts 572, lead 599, the aforementioned contacts, lead 699 and leads corresponding thereto respectively and the "X" contacts of the respective energized indicator relays to operate their right windings so that the respective lamp panels associated therewith display the proper configuration until the next transfer operation.

The two control relays 659 and 669 of the indicator translating group of relays each have six contacts to reduce the amount of current passing through any one contact although a lesser number of contacts for each would enable the proper lamp selection to be made. Thus to light lamps 3, 7, 11, 15, 19 and 23 to give a digit configuration conforming to the digit 1, relays 616 and 669 are operated as shown in the chart in FIG. 7 to close contacts 606—615 and 670—675 respectively to complete circuits for lighting the aforementioned lamps. The digit 6 is formed by lighting lamps 2, 3, 5, 9, 10, 11, 13, 16, 17, 20, 22 and 23 and contacts 660—665 respectively. As stated previously other lamp combinations are lighted to form particular digit indications on operation of the various indicator relays as shown in the chart in FIG. 7.

As the pulse over lead 1 comes to an end, relay 30 releases to open the circuit to the lower winding of relay 22 at contacts 35 and disconnects leads 2 and 3. It also closes contacts 31 to again place the collect thyratrons in condition for operation, and at contacts 34 prepares the upper winding of relay 20. Relay 20 releases to open contacts 21 and closes contacts 24 to allow the output of oscillator tube VO to feed into tube PSA and from there to cathode follower tube PSA' to advance the distributor as before described.

FIGS. 6 and 7 show the manner in which the lights of the units indicator panel are lit to form a configuration for each digit from 0–9. As each register group of tubes operates corresponding relays of their indicator relays to form similar digits only the indicator relays of the units group are shown. The standard method such as shown in the aforementioned patent to Robinson for transforming a registered count to a configuration in a light panel uses a code formed by certain combinations of relays among a total of five relays. In the instant case a total of seven relays are used as there are seven triodes, any two of which are fired to indicate a particular count. Therefore two relays of the seven are fired to give a configuration. One of the two relays must be 659 or 669 as these are control relays which determine whether the count is from 0–4 inclusive or 5–9 inclusive respectively. Only one of the other five is operated in combination with one of the control relays to give the desired configuration in the manner illustrated in the chart shown in FIG. 7. Thus the operation of any two relays of the other five by themselves or with any one of the two or both control relays will not give a readable configuration and thereby indicates trouble. Operation of two control relays alone gives the same result.

To reset the count a reset key (not shown) is closed to operate relay 505A which closes its associated contacts in the units, tens, hundreds, thousands, etc. register tubes to apply −300 volt potential to the left grids of all the tubes except that of the first tube in each registered group which has the −300 volt potential applied to the right grid. This extinguishes all the fired left triodes and a fired right triode of any first tube to thus fire the right triode of each of those tubes and the left triode of the first tube in each register group to set the count at zero in each group.

The count in any set of register tubes may be reset or advanced by closing a switch associated with each adding machine input circuit cathode follower for providing an input pulse to each particular counting chain. Switches M2, M5, M10, M50 and M100 respectively (FIG. 3) are provided for this purposes. When M2 is closed the 20 volt charge on the condenser associated therewith is discharged to ground over resistor 309 to provide a positive pulse for advancing the count of the units register tubes once. This switch M2 may be closed as often as desired to advance the count correspondingly. Each of the other switches may be operated to advance the count of its associated register tubes in the same manner.

Operation of disabling key 75 places a full −20 volt potential on grid 208 and the corresponding grids of all the collect thyratrons to prevent their operation.

The description of my invention refers to the particular modification shown, however, it is understood that the invention discussed in the specification is capable of many adaptations.

What is claimed is:

1. In a totalizing system of the type having a number of positions from which a plurality of items are registered only in individually corresponding count storing circuits and in a count storing circuit common to said plurality of items, each of said storing circuits arranged to register and store a count of more than one item, a device for confirming a registration made from each position, and an electronic scanner for activating each position whereby a registration of an item is made in the count storing circuit individual to said item and in said common count storing circuit, the improvement comprising means at each position controlled by said scanner for a predetermined time, and means associated with all of said count storing circuits and controlled by an individual and said common storing circuits on the registration of an item therein and regardless of the count therein if said registrations are made in said predetermined time only for cooperating with said scanner controlled means to enable the device to confirm the registrations.

2. In a totalizing system of the class in which individual items are registered in individually corresponding electronic counting circuits for counting each total thereof and are registered in an electronic counting circuit common to all said items for counting the total of all items, a number of positions from which said items are registered, and a device for confirming a registration made from each position, the improvement comprising an electronic scanner providing only one marking for each position for a predetermined time whereby a registration of an item is made in the counting circuit individual thereto and in said common counting circuit, and means operated in response to the registrations of said item within said predetermined time and the provision of said marking for enabling the device to confirm the registrations.

3. In a totalizing system of the class in which individual items are registered in individually corresponding electronic counting circuits for counting each total thereof and are registered in another electronic counting circuit for counting the total of all items, a number of positions from which said items are registered and having an electronic scanner for scanning each position to enable a registration to be made therefrom and a device for confirming each registration, the improvement comprising timing means individually associated with each electronic counting circuit for enabling an item to be registered in each counting circuit within a predetermined time, and means effective in response to the registration of an item in its individual electronic counting circuit and said other electronic counting circuit within said predetermined time for enabling said device to confirm said registration.

4. A system of the type claimed in claim 3 in which said last means comprises an electronic valve arrangement associated with said individual counting circuits and said common counting circuits, means whereby said valve arrangement is conditioned in accordance with the time within which said registrations are made, and means at the position from which said registrations are made operated by said valve arrangement if it is conditioned in accordance with a registration made in said predetermined time for enabling said device to confirm a registration from said position.

5. In an electronic totalizing system of the class having means of the type providing a record of a registration at a particular time after which time an additional registration may be made while said record is maintained, the improvement comprising an electronic counting circuit for registering more than one item, a number of positions from which said items are registered, an electronic scanner for providing a marking at each position to effect a registration in said electronic counting circuit, and means periodically conditioned by said electronic counting circuit for enabling the operation of said means for providing said record regardless of the number of items registered in said counting circuit.

6. A system such as claimed in claim 5, in which said means conditioned by said electronic counting circuit comprises one electronic valve conditioned by said counting circuit whenever a registration is made in said counting circuit, and means controlled by said conditioned electronic valve for enabling the operation of said means for providing said record.

7. A system such as claimed in claim 5, in which said means conditioned by said electronic counting circuit comprises a plurality of relays connected to said counting circuit, means for rendering said relays ineffective to interfere with the registration of items in said electronic counting circuit and rendering said relays unaffected by a registration in said counting circuit, and means operated periodically for temporarily preventing further registrations in said counting circuit and for causing said relays to be controlled by said counting circuit in accordance with a count registered therein to operate said means for providing a record.

8. In a system such as claimed in claim 7, an indicator arrangement for said counting circuit comprising a group of lights individual to said counting circuit, and means controlled by said connected relays when controlled in accordance with a count registered in its associated counting circuit for controlling certain of said lamps corresponding to the count in said counting circuit for forming a digit configuration.

9. For use with a plurality of electronic counting circuits for indicating a registration in any one electronic counting circuit, means associated with each counting circuit and controlled by its associated counting circuit for indicating the registration therein, means associated with each counting circuit and periodically operated only if its associated counting circuit has a registration therein for causing its associated counting circuit to control its associated indicating means to indicate the registration therein, and means associated with one counting circuit and controlled by said periodically operated means for causing a predetermined counting circuit having no registration therein to control its associated indicating means to indicate that no registration exists in its associated counting circuit.

10. For use with an electronic counting circuit wherein more than one item can be registered, means associated therewith for providing a record of the registration in the associated circuit at a particular time after which time an additional registration may be made while said record is maintained, means associated with said circuit and periodically operated thereby only if a registration exists in said circuit and regardless of the number thereof for operating said record means in accordance with the registration in its associated circuit, a second electronic counting circuit and means associated with said second electronic counting circuit operated if a registration is made in said second counting circuit for enabling the record means associated with said first counting circuit if no registration exists in said first circuit.

11. In a totalizing system having recording apparatus associated therewith operable for preparing ticket issuing machine circuits, each of said ticket issuing machine circuits individually representing a different condition and a different amount, the improvement comprising groups of electronic counting circuits, each group of electronic counting circuits individually associated with one of said ticket issuing machine circuits, another group of electronic counting circuits associated with all of said ticket issuing machine circuits, an electronic scanning device, an oscillator for operating said electronic scanning device to associate said scanning device with each of said ticket issuing machine circuits successively to complete a prepared one of said ticket issuing machine circuits to advance its associated group of electronic counting circuits and said other group of electronic counting circuits in accordance with the amount represented by said ticket issuing machine circuit, and means controlled by both said advanced groups of counting circuits when in their ultimate position as a result of said advancement, said last means thereafter effective in response to said control for enabling said apparatus to record the condition and amount represented by said ticket issuing machine circuit if said scanning device is still associated therewith.

12. In a totalizing system having recording apparatus associated therewith operable for preparing ticket issuing machine circuits, each of said ticket issuing machine circuits individually representing a different condition and amount, the improvement comprising an electronic counting circuit common to all of said conditions, interconnecting circuits individually interconnecting said ticket issuing machine circuits and a corresponding one of said electronic counting circuits and said common electronic counting circuit, an automatically operated electronic scanning device, means for operating said scanning device to cause it to scan said ticket issuing machine circuits successively to thereby cause a prepared circuit to be effective over said interconnecting circuits to advance its corresponding electronic counting circuit and said common electronic counting circuit in accordance with the amount represented, and means thereafter operated by said corresponding and said common counting circuits when in their ultimate position as a result of said advancement for enabling said apparatus to record the condition and amount represented by said scanned and prepared ticket issuing machine circuit.

13. In a totalizing system having recording apparatus associated therewith operable for preparing one of a plurality of thyratron tube circuits, by the application of a particular potential thereto, the improvement comprising runner electronic counting circuits individually corresponding to each of said thyratron tube circuits, a total electronic counting circuit common to all of said thyratron tube circuits, a first connecting circuit individually linking one of said thyratron tube circuits and a corresponding one of said runner counting circuits in response to the application of said particular potential to said one thyratron tube circuit for preparing said one thyratron tube circuit, a second connecting circuit linking said thyratron tube circuits and said common total electronic counting circuit, an automatically operated electronic scanning device, means for operating said scanning device to cause it to scan said thyratron tube circuits to thereby cause a prepared thyratron tube circuit having said potential applied thereto to transmit a signal over each of the linking circuits to advance the corresponding runner electronic counting circuit and said common total electronic counting circuit, and means thereafter operated by said corresponding runner and said common total electronic counting circuits for enabling said apparatus to record.

14. In a totalizing system a plurality of runner counting circuits each individual to a different runner for registering sums and each comprising a plurality of stages each corresponding to different sums, a common totals counting circuit for registering sums and comprising a plurality of stages each corresponding to different sums, a plurality of ticket issuing machines each having a runner input circuit individual to a runner and to one of a plurality of values interconnected with a corresponding runner counting circuit stage and a totals input circuit individual to the same value interconnected with a corresponding common totals counting circuit stage, means at each ticket issuing machine for preparing said runner input circuit interconnected with a corresponding runner counting circuit stage and the totals input circuit interconnected with said common totals counting circuit stage, pulsing means for successively scanning each ticket issuing machine for a particular time period, circuit means associated with each ticket issuing machine effective over the interconnection of each prepared circuit with its corresponding stage during the time period its associated machine is being scanned for amending the sum registered in the counting circuit individual to the runner and in the common counting circuit respectively in accordance with the value represented by said prepared circuit, and last means operated only if the sums registered in said runner and common counting circuits are amended within said particular time for enabling said ticket issuing machine to issue a ticket.

15. A system such as claimed in claim 14 in which said last means comprise an electronic valve individual to each counting circuit, means responsive to the amendment of the sum registered in one runner counting circuit and said common counting circuit for controlling the electronic valve individual thereto, and means responsive to the control of the valves individual to said runner counting circuit and the valve individual to said common counting circuit for enabling said ticket issuing machine.

16. An arrangement such as claimed in claim 13 in which said electronic scanning device comprises a plurality of groups of electronic valves, means for successively conditioning each valve in one group of said valves, means operated each time a predetermined number of valves in said one group are conditioned for successively conditioning each valve in a second group of said valves, and circuits each individually interconnecting each valve of said second group with each valve in said one group and each of said first circuits so that said one first circuit is enabled to transmit said signal in response to the simultaneous conditioning of its respective interconnected valves in said first and second groups.

(References on following page)

References Cited in the file of this patent

UNITED STATES PATENTS

| | | |
|---|---|---|
| 2,451,489 | Joel | Oct. 19, 1948 |
| 2,472,542 | Moerman | June 7, 1949 |
| 2,479,681 | Handley | Aug. 23, 1949 |
| 2,528,394 | Sharpless et al. | Oct. 31, 1950 |
| 2,557,384 | Klein | June 19, 1951 |
| 2,563,041 | Johnston | Aug. 7, 1951 |
| 2,563,102 | Crosman et al. | Aug. 7, 1951 |
| 2,594,276 | Barker et al. | Apr. 29, 1952 |
| 2,605,967 | Stone | Aug. 5, 1952 |
| 2,615,127 | Edwards | Oct. 21, 1952 |
| 2,616,965 | Hoeppner | Nov. 4, 1952 |
| 2,672,599 | Foster | Mar. 16, 1954 |
| 2,837,281 | Wright et al. | June 3, 1958 |
| 2,892,526 | Devaud | June 30, 1959 |